(12) United States Patent
Sasaki et al.

(10) Patent No.: US 6,716,993 B2
(45) Date of Patent: Apr. 6, 2004

(54) POLYMETHINE COMPOUND AND NEAR-INFRARED ABSORBING MATERIAL COMPRISING SAME

(75) Inventors: Nobuaki Sasaki, Kyoto (JP); Keiki Chichiishi, Kyoto (JP); Shigeo Fujita, Kawachinagano (JP); Yasuhisa Iwasaki, Nara (JP)

(73) Assignee: Yamamoto Chemicals, Inc., Osaka (JP)

( * ) Notice: Subject to any disclaimer, the term of this patent is extended or adjusted under 35 U.S.C. 154(b) by 0 days.

(21) Appl. No.: 10/453,514

(22) Filed: Jun. 4, 2003

(65) Prior Publication Data

US 2003/0232999 A1 Dec. 18, 2003

(30) Foreign Application Priority Data

Jun. 7, 2002 (JP) ........................................ 2002/167630

(51) Int. Cl.[7] ........................... C07D 403/08; G03F 7/00
(52) U.S. Cl. ................. 548/454; 548/455; 430/270.1; 430/302; 430/944; 430/945
(58) Field of Search .................................. 548/454, 455

(56) References Cited

U.S. PATENT DOCUMENTS 6,342,335 B1 * 1/2002 Fujita et al. ............. 430/270.1

* cited by examiner

Primary Examiner—Laura L. Stockton
(74) Attorney, Agent, or Firm—Birch, Stewart, Kolasch & Birch, LLP

(57) ABSTRACT

The invention provides novel compounds which show high sensitivity to near-infrared rays in the region of 750–950 nm and, when processed to give films and so forth, undergo only slight discoloration and retain high transparency, hence can be used as near-infrared absorbing materials, together with an intermediate thereof. Thus provided are polymethine compounds of the general formula (I):

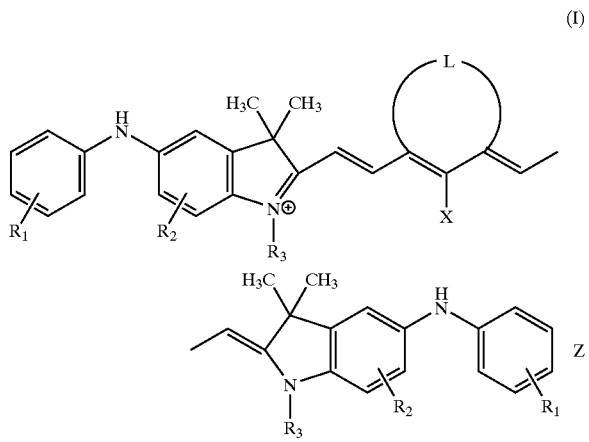

wherein $R_1$ and $R_2$ each independently represents a hydrogen atom, an alkyl group or an alkoxy group, $R_3$ represents an alkyl group, which may optionally be substituted, L represents an alkylene group necessary for the formation of a cyclic structure, X represents a hydrogen atom, a halogen atom or a substituted amino group, and Z represents an acidic residue, as well as near-infrared absorbing materials comprising the same.

13 Claims, 10 Drawing Sheets

POLYMETHINE COMPOUND AND NEAR-INFRARED ABSORBING MATERIAL COMPRISING SAME

This nonprovisional application claims priority under 35 U.S.C. §119(a) on Patent Application No(s). 2002-167630 filed in JAPAN on Jun. 7, 2002, which is(are) herein incorporated by reference.

BACKGROUND OF THE INVENTION

1. Field of the Invention

The present invention relates to a novel polymethine compound, an indolenine compound and an intermediate thereof, and near-infrared absorbing materials comprising the polymethine compound. More specifically, it relates to a polymethine compound excellent in absorptive power in the near-infrared region of 750–950 nm but less absorptive in the visible region, hence useful not only as a near-infrared absorbing material for use in laser beam-exploiting plate-making, laser thermal recording media, toners for flash fixing electrophotography but also as a dye for security ink, a dye for near-infrared absorbing filters, a spectral sensitizing dye for electrophotography or silver halide photography, and a dye for optical disk use, among other applications.

2. Description of the Prior Art

Various organic dyes sensitive to rays in the near-infrared region, inclusive of phthalocyanine dyes, polymethine dyes, aluminum-based dyes, diiummonium dyes, and dithiol metal complex dyes, among others, have been proposed in the art and, in particular, phthalocyanine dyes and polymethine dyes, which are excellent in absorbing capacity or absorptive power, have been utilized in various fields.

Generally, phthalocyanine dyes have good light resistance and durability but are low in solubility in various solvents. They absorb light in the visible region as well. Therefore, the range of their application is restricted. Polymethine dyes are low in light stability, hence have limited uses.

Modifications derived from polymethine compounds by introduction of a cyclic structure into part of the methine chain as means for improving the durability of such compounds are known in the art. For example, the following compound A is described in Laid-open Japanese Patent Application (JP Kokai) S63-319191, page 3, specific compound No. 9, and the following compound B in the Journal of Organic Chemistry, 60, 2392, Table 1.

Compound A

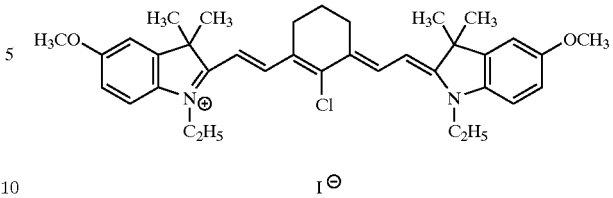

Compound B

However, both the compounds A and B show an absorption maximum in the wavelength range of 785–815 nm. Thus, they are insufficient in sensitivity to those small-sized, high-power lasers which are currently under intensive investigation for the practical use thereof and have an emission wavelength range of 820–840 nm. As for the absorptive power in the range of 850–950 nm, which is highly required of near-infrared absorbing materials, they are low as well. The compounds A and B are both low in solubility in solvents and in compatibility with resins. Thus, the binder resins and other ingredients that can be used are limited. A further drawback is that they are discolored upon processing to give films and the like.

A primary object of the present invention is to provide a novel polymethine compound showing intense absorption in the near-infrared region of 750–950 nm, having high solubility in solvents and high compatibility with resins, showing low absorptivity in the visible region, having high transparency and showing a tendency toward discoloration only to a slight extent upon processing to give films or the like.

Another object of the invention is to provide 5-anilino-2,3,3-trimethylindolenine, which is one of the important intermediates for the production of the polymethine compound mentioned above.

A third object of the invention is to provide a near-infrared absorbing material comprising the polymethine compound mentioned above.

SUMMARY OF THE INVENTION

As a result of various investigations made to accomplish the above objects, the present inventors found that certain novel polymethine compounds show strong absorption in the near-infrared region (750–950 nm), in particular in the range of 850–950 nm and show only weak absorption in the visible region and, therefore, can be used as near-infrared absorbing materials readily processed for application in various fields. Based on such and other findings, the present invention has now been completed.

In a first aspect, the present invention provides polymethine compounds represented by the general formula (I):

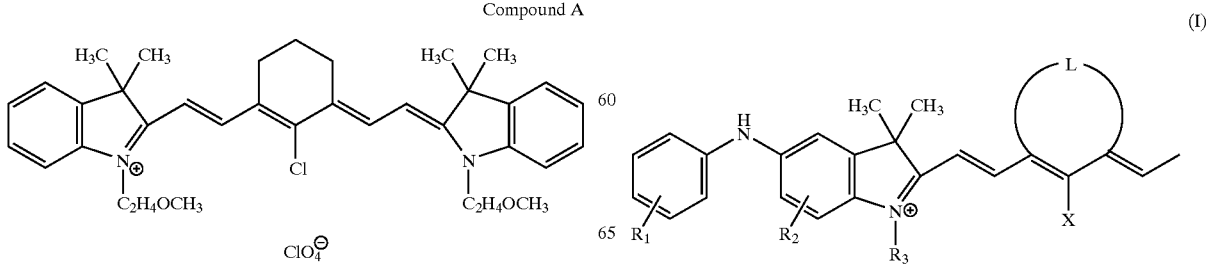

-continued

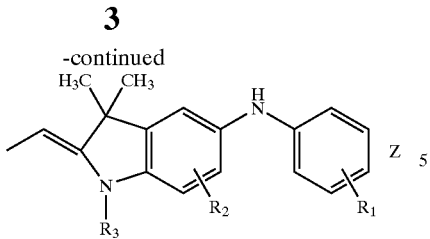

wherein $R_1$ and $R_2$ each independently represents a hydrogen atom, an alkyl group or an alkoxy group, $R_3$ represents an alkyl group, which may optionally be substituted, L represents an alkylene group necessary for the formation of a cyclic structure, X represents a hydrogen atom, a halogen atom or a substituted amino group, and X represents an acidic residue.

In a second aspect, the invention provides 5-anilino-2,3,3-trimethylindolenine, which is useful as an intermediate for the production of the polymethine compounds according to the first aspect of the invention and has the following formula:

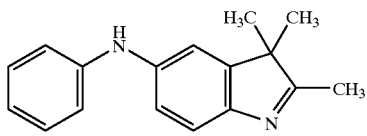

In a third aspect, the invention provides near-infrared absorbing materials containing any of the above polymethine compounds according to the first aspect of the invention.

DETAILED DESCRIPTION OF THE PREFERRED EMBODIMENTS OF THE INVENTION

Figure 1:
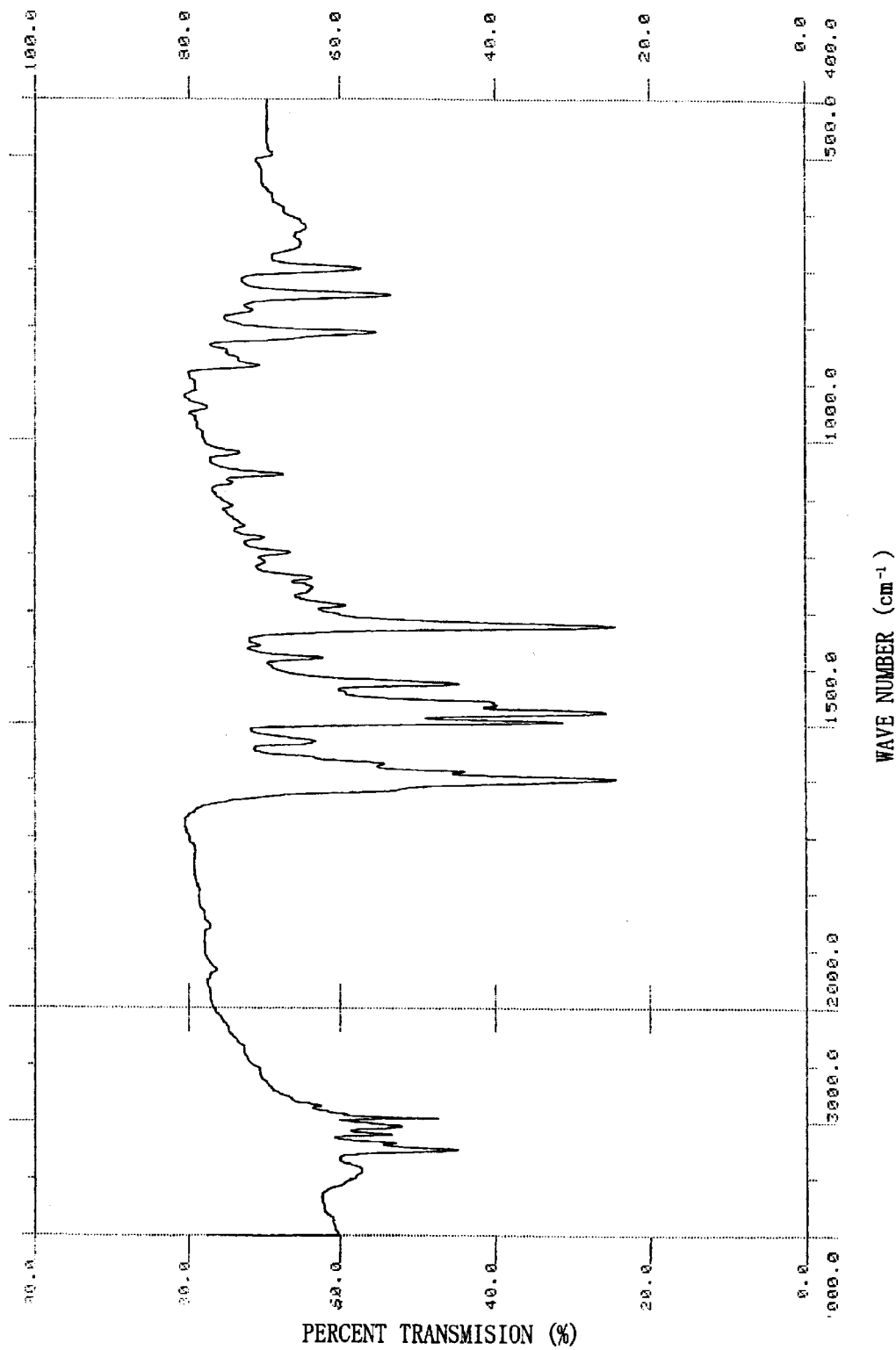
FIG. 1 is an IR absorption spectrum of 5-anilino-2,3,3-trimethylindolenine according to Example 1.

In the following, the present invention is described in detail.

[Polymethine Compounds]

To begin with, the polymethine compounds according to the first aspect of the invention which are represented by the following general formula (I):

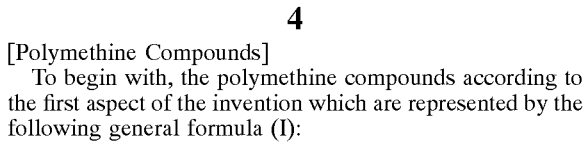

(I)

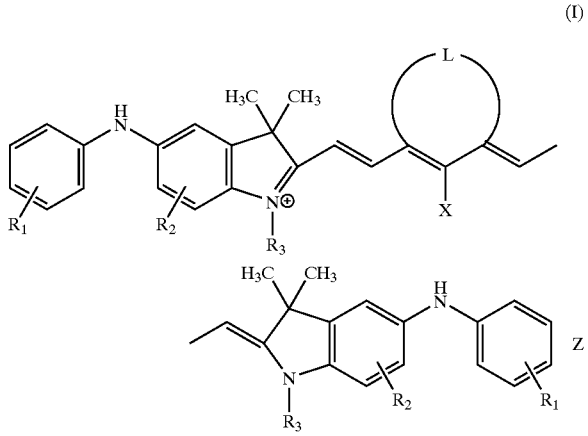

wherein $R_1$ and $R_2$ each independently represents a hydrogen atom, an alkyl group or an alkoxy group, $R_3$ represents an alkyl group, which may optionally be substituted, L represents an alkylene group necessary for the formation of a cyclic structure, X represents a hydrogen atom, a halogen atom or a substituted amino group, and X represents an acidic residue.

Preferred as each of $R_1$ and $R_2$ are a hydrogen atom, an alkyl group containing 1 to 4 carbon atoms, and an alkoxy group containing 1 to 4 carbon atoms, and a hydrogen atom is most preferred. As examples of the alkyl and alkoxy groups, there may be mentioned methyl, ethyl, n-propyl, isopropyl, n-butyl, isobutyl, sec-butyl, tert-butyl, n-pentyl, n-hexyl, n-octyl, methoxy, ethoxy, propoxy, isopropoxy, n-butoxy, isobutoxy, sec-butoxy, n-pentyloxy, n-hexyloxy, and n-octyloxy.

The unsubstituted alkyl group $R_3$ is preferably one containing 1 to 8 carbon atoms, more preferably one containing 1 to 4 carbon atoms. Examples are methyl, ethyl, n-propyl, isopropyl, n-butyl, isobutyl, sec-butyl, n-pentyl, isopentyl, neopentyl, n-hexyl, isohexyl, sec-hexyl, 2-ethylbutyl, n-heptyl, isoheptyl, sec-heptyl, n-octyl, and 2-ethylhexyl.

When $R_3$ is a substituted alkyl, it is preferably a straight or branched alkoxyalkyl group containing 2 to 8 carbon atoms in total, more preferably an alkoxyalkyl group containing 2 to 6 carbon atoms in total. Examples are methoxymethyl, 2-methoxyethyl, 3-methoxypropyl, 4-methoxybutyl, 2-ethoxyethyl, 3-ethoxypropyl, 4-ethoxybutyl, 2-n-propoxyethyl, 2-isopropoxyethyl, 3-n-propoxypropyl, 4-n-propoxybutyl, 2-methoxy-2-ethoxyethyl, 2-ethoxy-2-ethoxyethyl, and 2-butoxy-2-ethoxyethyl.

L is a substituted or unsubstituted alkylene group and forms a ring together with the three carbon atoms in total, namely the carbon atom bound to X and the two carbon atoms neighboring thereto.

L is preferably an alkylene group containing 2 to 4 carbon atoms, more preferably an alkylene group containing 2 or 3 carbon atoms. Examples are ethylene, propylene and butylene.

X is a hydrogen atom, a halogen atom or a substituted amino group. Preferred as the halogen atom are F, Cl, Br and I. Preferred as the substituted amino are ethylamino, phenylamino, and diphenylamino. Most preferred as X is Cl.

Z represents an acidic residue, including $F^-$, $Cl^{31}$, $Br^-$, $I^-$, $BrO_4^-$, $ClO_4^-$, $BF_4^-$, $PF_6^-$, $SbF_6^-$, $CF_3CO_2^-$, $CH_3CO_2^-$, $CF_3SO_3^-$, $CH_3SO_3^-$, p-toluenesulfonato (hereinafter referred to as $TsO^-$), among others. In particular, $Cl^-$, $Br^-$, $I^-$, $ClO_4^-$, $BF_4^-$, $PF_6^-$, $SbF_6^-$, $CF_3CO_2^-$, $CF_3SO_3^-$, $CH_3SO_3^-$, and $TsO^-$ are preferred.

Preferred as the polymethine compound of general formula (I) are those in which $R_1$ and $R_2$ each independently is a hydrogen atom, an alkyl group containing 1 to 4 carbon atoms, or an alkoxy group containing 1 to 4 carbon atoms, $R_3$ is an unsubstituted alkyl group containing 1 to 8 carbon atoms or an alkoxyalkyl group containing 2 to 8 carbon atoms in total, L is an alkylene group containing 2 to 4 carbon atoms, X is F, Cl, Br, I, ethylamino, phenylamino or diphenylamino, and Z is $Cl^-$, $Br^-$, $I^-$, $ClO_4^-$, $BF_4^-$, $PF_6^-$, $SbF_6^-$, $CF_3CO_2^-$, $CF_3SO_3^-$, $CH_3SO_3^-$ or $TsO^-$.

Specific preferred examples of the polymethine compound of general formula (I) are shown below, without any intention to limit the scope of compounds of general formula (I) thereto.

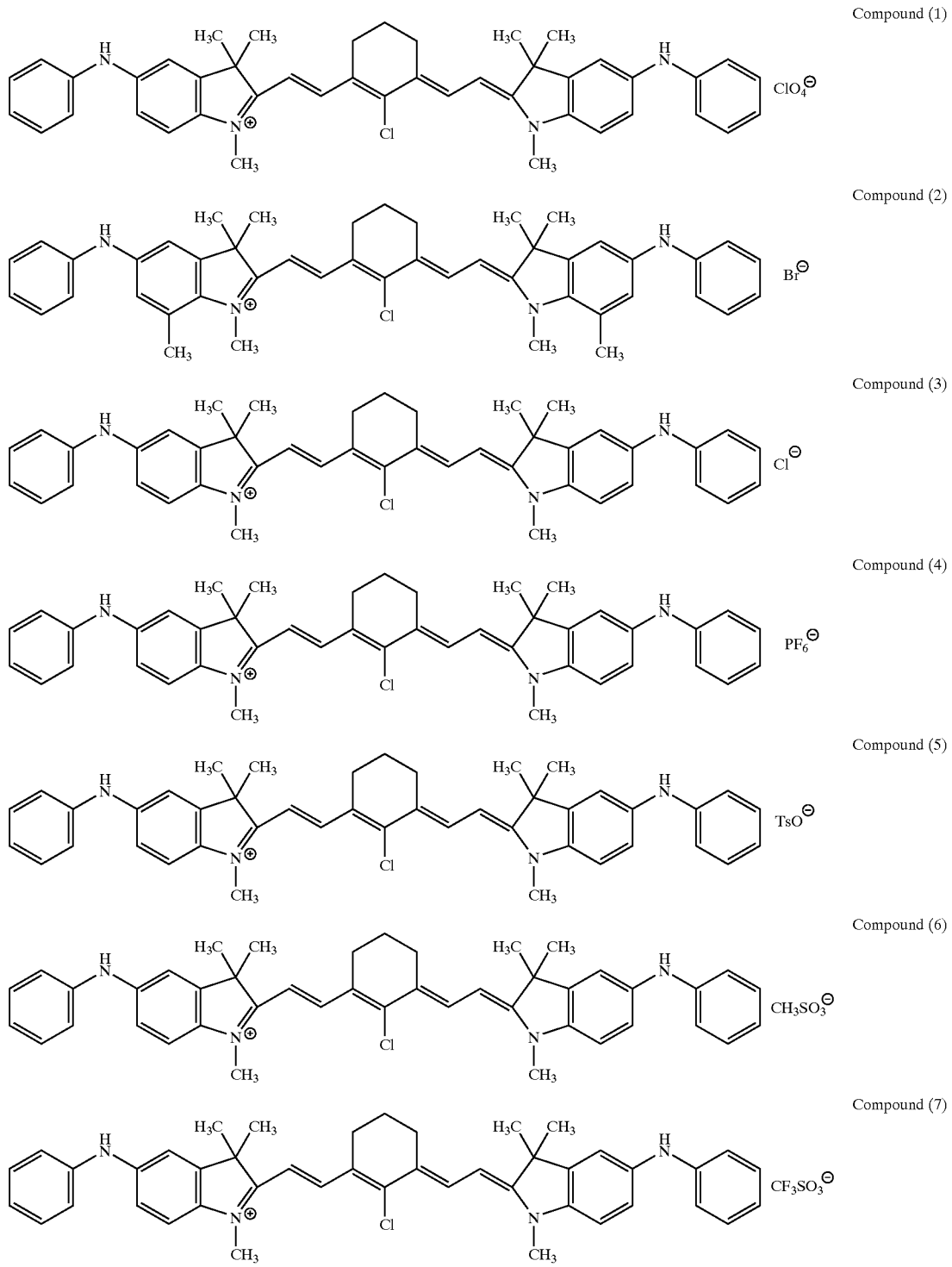

-continued
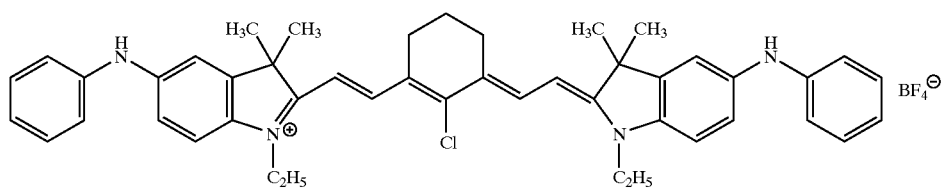
Compound (8)
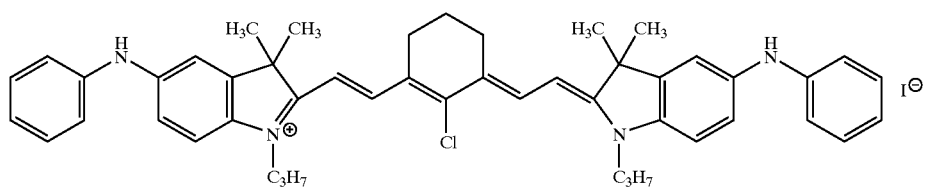
Compound (9)
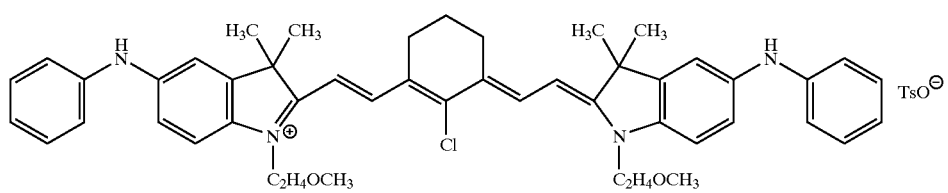
Compound (10)
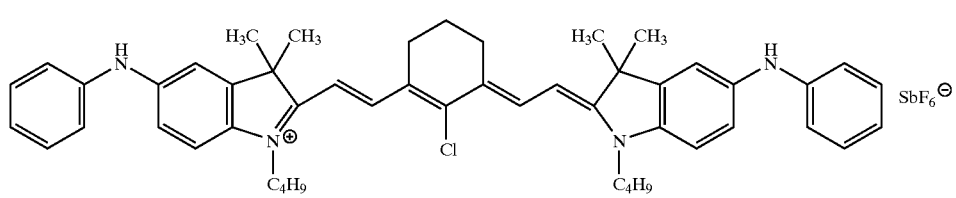
Compound (11)
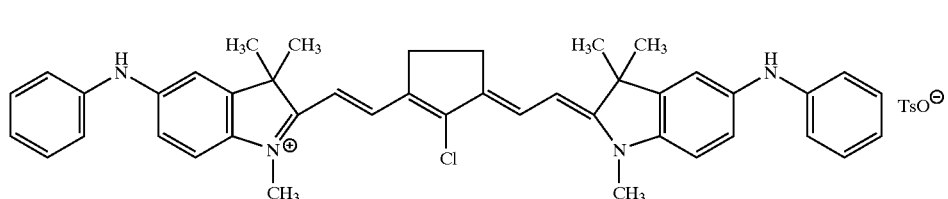
Compound (12)
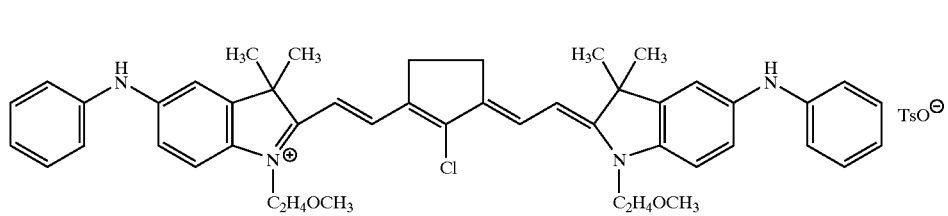
Compound (13)
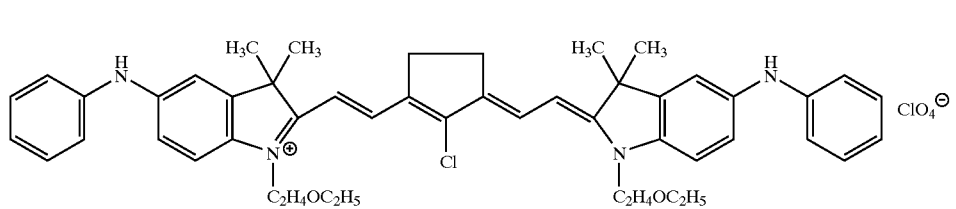
Compound (14)
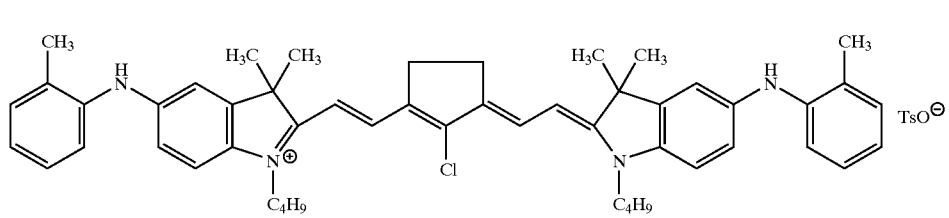
Compound (15)

-continued
Compound (16)
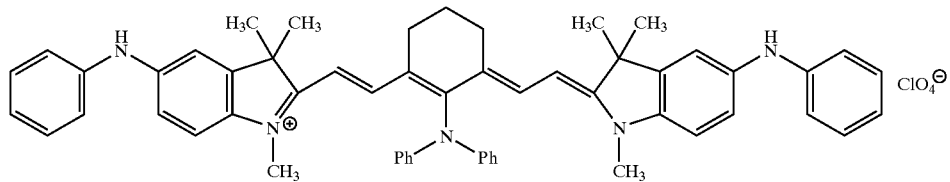
Compound (17)
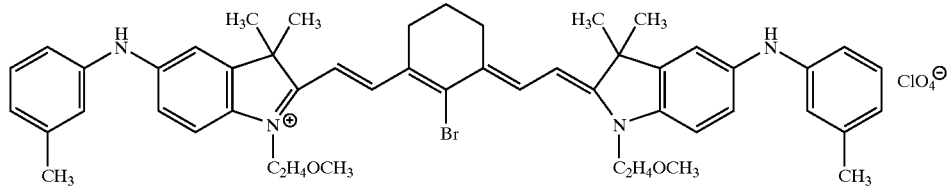
Compound (18)
Compound (19)
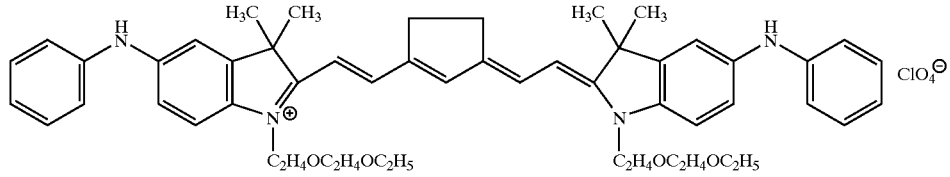
Compound (20)
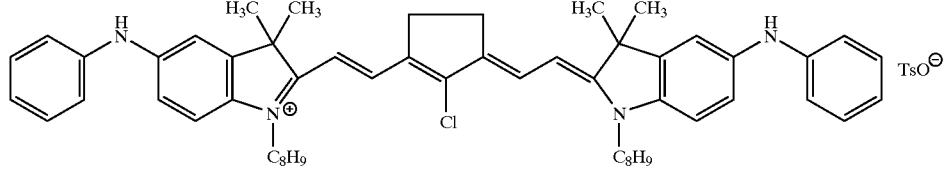
Compound (21)
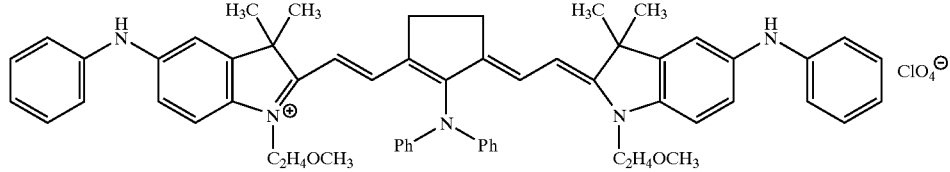
Compound (22)
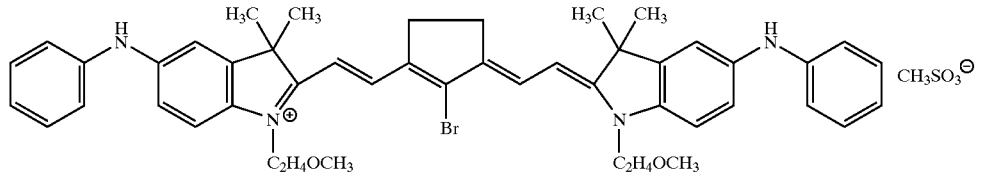
Compound (23)
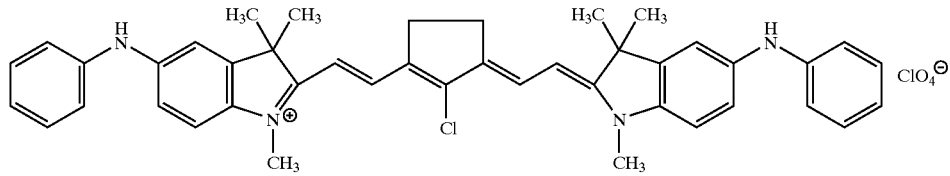

-continued
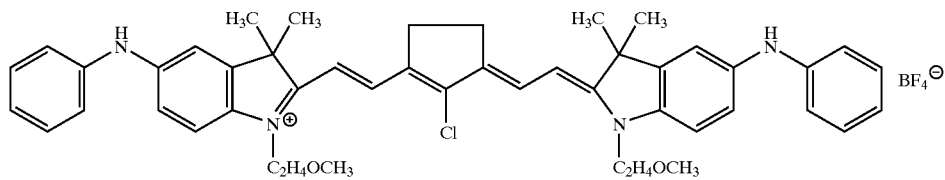 Compound (24)
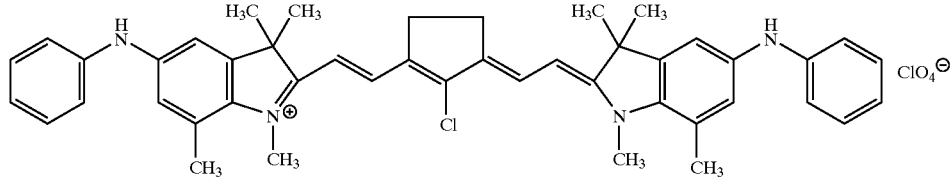 Compound (25)
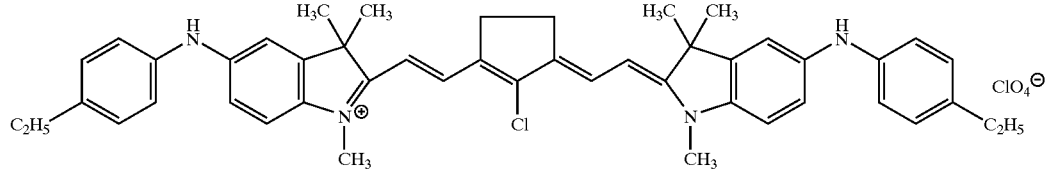 Compound (26)
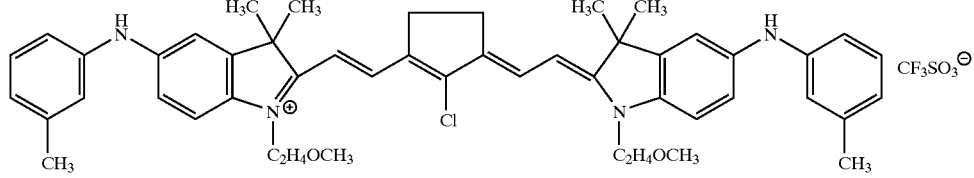 Compound (27)
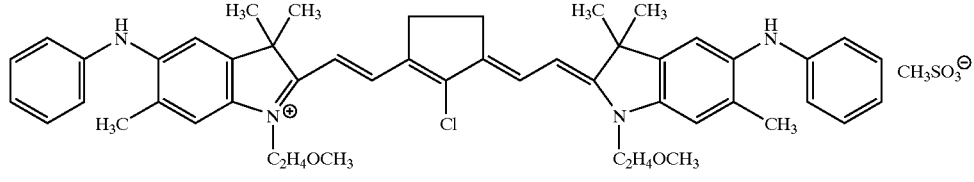 Compound (28)
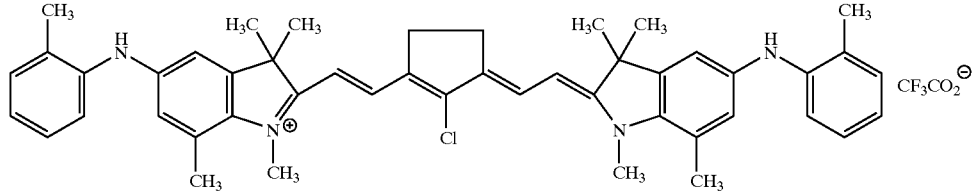 Compound (29)
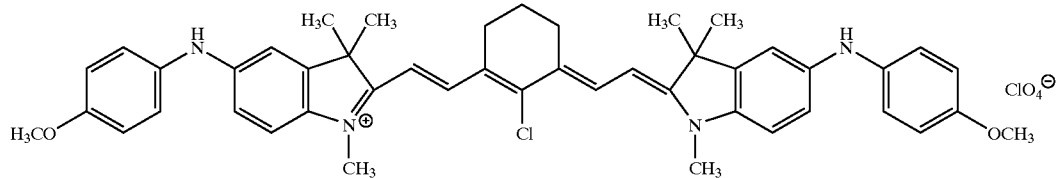 Compound (30)
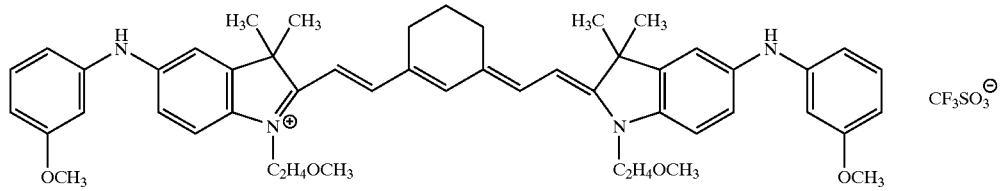 Compound (31)

-continued
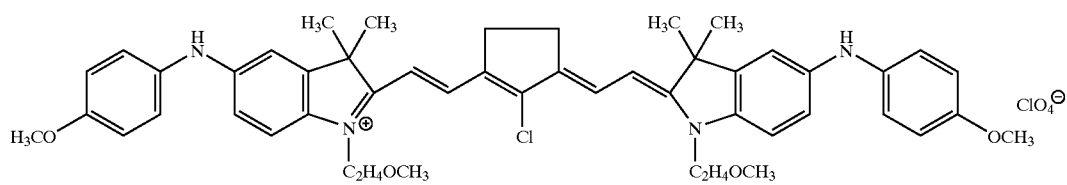
Compound (32)
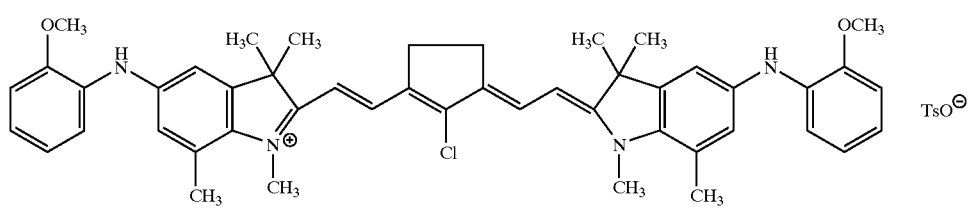
Compound (33)
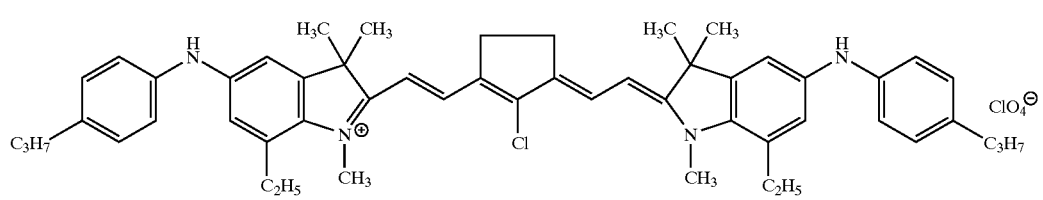
Compound (34)
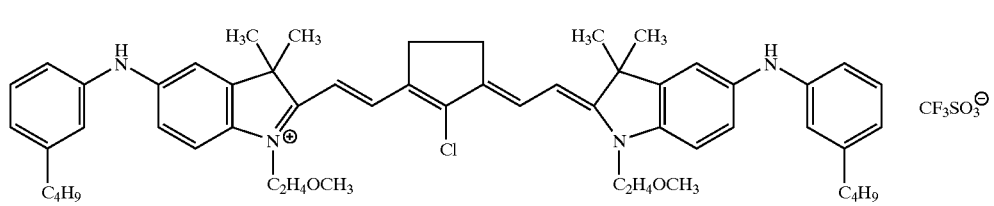
Compound (35)
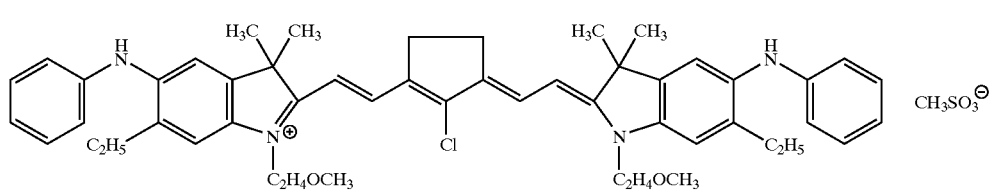
Compound (36)
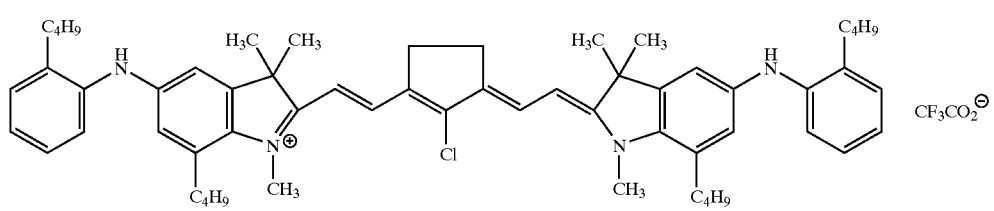
Compound (37)
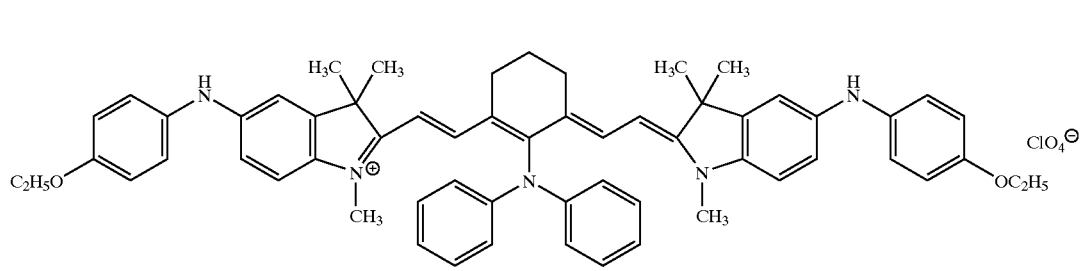
Compound (38)

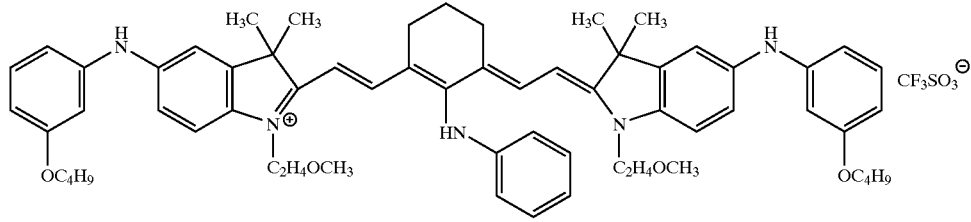

Compound (39)

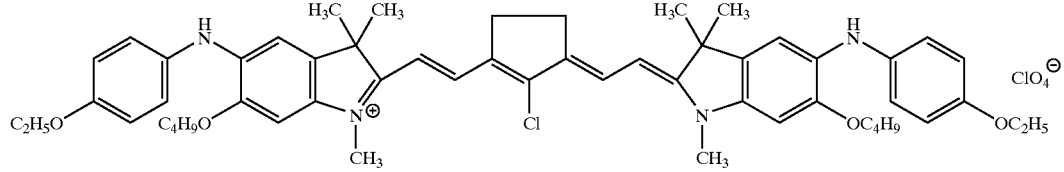

Compound (40)

[Method of Producing the Polymethine Compounds]

The above-mentioned polymethine compounds according to the invention can be produced, for example, by subjecting an indolenium compound represented by the general formula (III) and a diformyl compound represented by the general formula (IV) or a dianil compound represented by the general formula (V) to condensation in a dehydrating organic acid in the presence of a fatty acid salt.

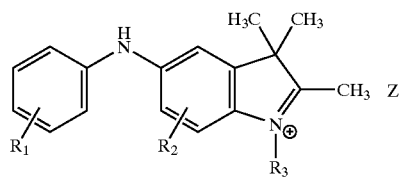

(III)

(In the above formula, $R_1$, $R_2$, $R_3$ and Z are as defined above.)

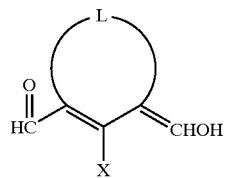

(IV)

(In the above formula, L and X are as defined above.)

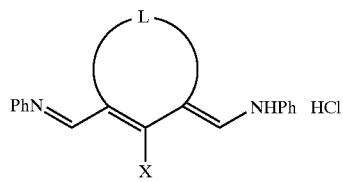

(V)

(In the above formula, L and X are as defined above.)

The fatty acid salt to be used in the above condensation reaction includes, among others, sodium acetate, potassium acetate, calcium acetate, sodium propionate, and potassium propionate.

Such fatty acid salt is used generally in an amount of about 0.1 to 5 moles, preferably about 0.5 to 2 moles, per mole of the compound of general formula (III).

The dehydrating organic acid includes acetic anhydride, propionic anhydride, butyric anhydride, and γ-butyrolactone, among others.

Such dehydrating organic acid is used generally in an amount of about 10 to 100 moles, preferably about 20 to 50 moles, per mole of the compound of general formula (III).

As for the mole ratio between the compound of general formula (III) and the compound of general formula (IV) or (V), the latter is generally used in an amount of about 0.2 to 1.5 moles, preferably about 0.4 to 0.7 mole, per mole of the former.

The above reaction can favorably proceed generally at about 10 to 150° C., preferably at room temperature to 120° C., and the reaction generally comes to an end in several minutes to about 3 hours.

After reaction, the objective compound can be isolated from the reaction mixture with ease, for example, by pouring a poor solvent such as water, methanol, ethanol, n-propanol, isopropanol or n-butanol into the reaction mixture, or discharging the reaction mixture into a poor solvent such as water, methanol, ethanol, n-propanol, isopropanol, or n-butanol. It can easily be purified by any of the conventional means for purification, for example by recrystallization and/or column chromatography.

The above-mentioned isoindolenium compound of general formula (III) can be produced by alkylating an indolenine compound of the formula (II) given below using an alkylating agent represented by the formula (VI), for instance, in the presence or absence of a reaction solvent.

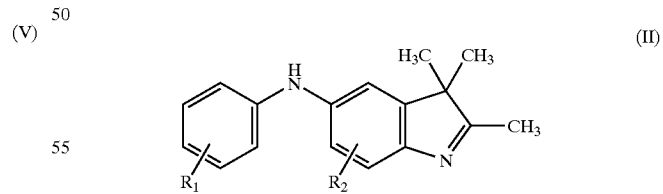

(II)

(In the above formula, $R_1$ and $R_2$ are as defined above.)

$R_3Z_1$ (VI)

(In the above formula, $R_3$ is as defined above and $Z_1$ represents a halogen atom or a p-toluenesulfonyloxy or methanesulfonyloxy group.)

Preferred examples of the alkylating agent to be used in the above alkylation reaction are alkyl halides such as methyl iodide, ethyl iodide, propyl iodide, butyl iodide, propyl bromide, butyl bromide and methoxyethyl bromide, alkyl esters of p-toluenesulfonic acid, such as methyl tosylate, ethyl tosylate, propyl tosylate, butyl tosylate and methoxyethyl tosylate, and alkyl esters of methanesulfonic acid, such as methyl mesylate, ethyl mesylate, propyl mesylate, butyl mesylate and methoxyethyl mesylate, among others.

Such alkylating agent is used generally in an mount of about 0.5 to 3 moles, preferably about 0.8 to 1.5 moles, per mole of the compound of general formula (II).

In cases where a reaction solvent is used, the solvent is used generally in an amount of about 0.1 to 20 moles, preferably about 0.3 to 5 moles, per mole of the compound of general formula (II).

Preferred examples of the reaction solvent are aromatic hydrocarbons such as benzene, toluene, xylene and chlorobenzene, among others.

The above reaction can favorably proceed generally at a temperature of about 50 to 200° C., preferably 70 to 150° C., and the reaction generally comes to an end in several hours to about 24 hours.

After reaction, the objective product can be isolated from the reaction mixture by cooling the mixture for allowing the product to crystallize out. Under certain circumstances, the objective compound can be isolated from the reaction mixture with ease, for example, by pouring a hydrocarbon solvent such as hexane, heptane, benzene, toluene or xylene or a poor solvent such as methyl acetate or ethyl acetate into the reaction mixture, or discharging the reaction mixture into a hydrocarbon solvent such as hexane, heptane, benzene, toluene or xylene or a poor solvent such as methyl acetate or ethyl acetate. It can easily be purified by any of the conventional means for purification, for example by recrystallization and/or column chromatography.

After completion of the reaction, the intermediate may be subjected, without isolation, to the next step condensation reaction to produce the polymethine compound of general formula (I).

The acidic residue Z in the indolenium compound of general formula (III) can readily be converted to some other desired acidic residue by treatment with an alkali, such as NaOH or KOH, followed by reaction with an acid having the desired acidic residue. For example, even when the residue Z in the compound of formula (III) is the atom or group $Z_1$ derived from the alkylating agent (VI) used in the alkylation mentioned above, it can be easily replaced with another acidic residue, as illustrated by the following reaction scheme.

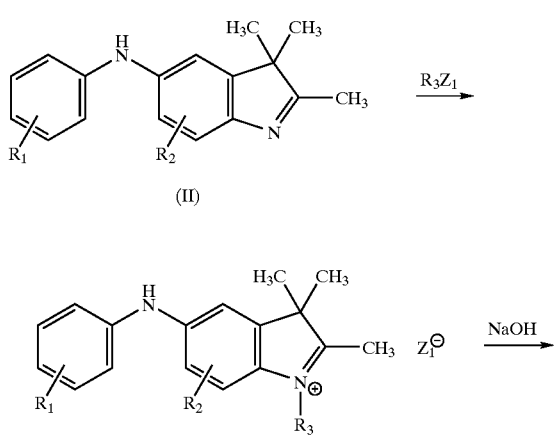

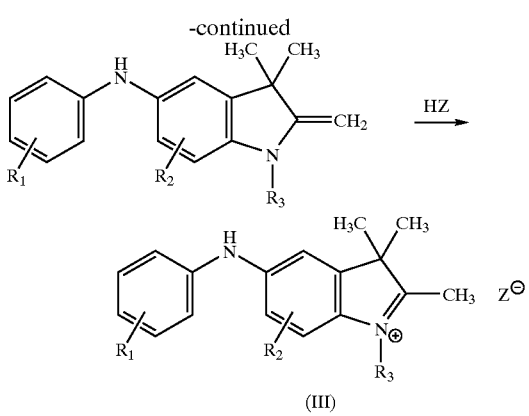

(III)

[Method of Producing Indolenine Compounds]

The indolenine compounds represented by the general formula (II) given above can be synthesized, for example, through two reaction steps, namely by reacting an aromatic amine represented by the general formula (VII) given below with 3-bromo-3-methylbutan-2-one in the presence of a base to give an anilinoketone compound represented by the general formula (VIII) given below (first reaction) and subjecting the anilinoketone compound to dehydration condensation in the presence of an acid catalyst (second reaction).

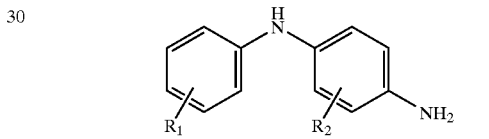

(In the above formula, $R_1$ and $R_2$ are as defined above.)

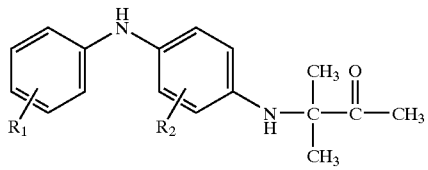

(In the above formula, $R_1$ and $R_2$ are as defined above.)

In the above first reaction, 3-bromo-3-methylbutan-2-one is used generally in an amount of about 0.5 to 3 moles, preferably about 0.7 to 2 moles, per mole of the aromatic amine of general formula (VII).

The base includes, among others, inorganic bases such as sodium hydroxide, potassium hydroxide, calcium hydroxide, sodium carbonate, potassium carbonate, sodium hydrogen carbonate, potassium hydrogen carbonate, calcium carbonate, sodium acetate, potassium acetate and magnesium oxide, and organic bases such as pyridine, ethylamine, diethylamine, triethylamine, tripropylamine and tributylamine. In particular, inorganic weak bases, such as sodium carbonate, potassium carbonate, sodium hydrogen carbonate, potassium hydrogen carbonate, sodium acetate, potassium acetate and magnesium oxide, are preferred.

Such base is used generally in an amount of about 0.2 to 3 moles, preferably about 0.4 to 1.5 moles, per mole of the aromatic amine of general formula (VII).

In this first reaction, a reaction solvent is preferably used.

The reaction solvent includes alcohols such as methanol, ethanol, n-propanol, isopropanol and n-butanol, aromatic hydrocarbons such as benzene, toluene, xylene, cumene, decalin, chlorobenzene and dichlorobenzene, aliphatic hydrocarbons such as hexane, heptane, octane, decane, cyclohexane, dichloroethane, trichloroethane and tetrachloroethane, dimethylformamide, dimethylacetamide, dimethylimidazolidinone, N-methylpyrrolidone, dimethyl sulfoxide, and sulfolane, among others. In particular, such aprotic polar solvents as dimethylformamide, dimethylacetamide, dimethylimidazolidinone, N-methylpyrrolidone, dimethyl sulfoxide and sulfolane are preferred.

Such reaction solvent is used generally in an amount of about 0.5 to 50 parts by weight, preferably about 2 to 20 parts by weight, per part by weight of the aromatic amine of general formula (VII).

The above reaction favorably proceeds generally at about 10 to 130° C., preferably at room temperature to 100° C., and the reaction generally comes to an end in several hours to about 30 hours.

In carrying out the first reaction, the simultaneous use of a reaction solvent and a base is preferred so that side reactions may be controlled and the desired anilinoketone compound may be formed in good yields. In particular, the simultaneous use of an aprotic polar solvent and a weak inorganic base is more preferred.

After completion of the reaction, the anilinoketone compound formed by the above first reaction may be isolated from the reaction mixture by distilling off the reaction solvent under reduced pressure. The concentrate can be purified with ease in the conventional manner of purification, for example by recrystallization, distillation and/or silica gel column chromatography.

In the second reaction step, the anilinoketone compound formed by the first reaction is dissolved in a solvent, preferably one capable of forming an azeotrope with water, in the presence of an acid catalyst, and then subjected to dehydration condensation, whereby the corresponding indolenine compound can be produced. The indolenine compound may also be produced by distilling off the reaction solvent under reduced pressure from the reaction mixture after completion of the first reaction, dissolving the concentrate in a solvent, preferably one capable of forming an azeotrope with water, and, after addition of an acid catalyst and if necessary after removing a salt fraction insoluble in the solvent by extraction with water, subjecting the resulting solution to azeotropic dehydration condensation without isolating the anilinoketone compound.

As the solvent capable of forming an azeotrope with water, there may be mentioned aromatic hydrocarbon such as benzene, toluene, xylene and chlorobenzene, and toluene and xylene are preferred.

Such azeotrope-forming solvent is used generally in an amount of about 0.5 to 50 parts by weight, preferably about 2 to 20 parts by weight, per part by weight of the anilinoketone compound.

The acid catalyst is, for example, an inorganic acid such as hydrochloric acid, sulfuric acid or phosphoric acid, a Lewis acid such as zinc chloride, or an organic acid such as benzenesulfonic acid, toluenesulfonic acid, toluenedisulfonic acid, formic acid, acetic acid, chloroacetic acid or propionic acid. In particular, benzenesulfonic acid, toluenesulfonic acid and toluenedisulfonic acid are preferred.

Such acid catalyst is used generally in an amount of about 0.01 to 1 mole, preferably about 0.1 to 0.6 mole, per mole of the anilinoketone compound.

The second reaction favorably proceeds generally at about 50 to 150° C., preferably at 80 to 130° C., and generally comes to an end in several hours to about 30 hours.

The thus-formed indolenine compound can be easily isolated from the reaction mixture, for example, by removing the acid catalyst by extraction with water and then distilling off the solvent. Although the indolenine compound isolated in such a manner already has a sufficient purity for its use as a reactant, it may be further purified with ease in the conventional manner of purification, for example by recrystallization, distillation and/or column separation.

[Another Starting Material for the Production of the Polymethine Compounds]

The diformyl compound of general formula (IV), which is another starting material for the production of the polymethine compounds, can be synthesized by the method described in the Journal of Organic Chemistry, 42, 885–888 (1977), for instance.

The dianil compound of general formula (V) can be easily synthesized by reacting the diformyl compound of general formula (IV) with aniline hydrochloride.

[Near-infrared Absorbing Materials]

While the polymethine compound of general formula (I) as such can be used as a near-infrared absorbing material, compositions comprising that compound and an additive(s) such as a binder resin can also be used as near-infrared absorbing materials.

The binder resin is not particularly restricted but includes homopolymers and copolymers of acrylic monomers such as acrylic acid, methacrylic acid, acrylic esters, methacrylic esters, etc.; cellulosic polymers such as methylcellulose, ethylcellulose, cellulose acetate, etc.; vinyl polymers and vinyl compound copolymers such as polystyrene, vinyl chloride-vinyl acetate copolymer, polyvinylpyrrolidone, polyvinyl butyral, polyvinyl alcohol, etc.; condensation polymers such as polyesters and polyamides, rubber type thermoplastic polymers such as butadiene-styrene copolymer, and polymers produced by the polymerization and crosslinking of photopolymerizable compounds such as epoxy compounds, among others.

Furthermore, in addition to the polymethine compound of general formula (I), various known near-infrared absorbing substances can be concomitantly used in the near-infrared absorbing material according to the invention within the range not departing from the spirit of the invention.

The near-infrared absorbing substances which can be used concomitantly include not only the common pigments, such as carbon black and aniline black, but also the various pigment type and dye type colors described in Near-Infrared-Absorbing Colors (p. 45–51) in "Kagaku Kogyo (Chemical Industry)", May, 1986 issue) and "Development and Market Trend of Functional Colors in the Ninties" CMC (1990), Chapter 2–2.3., such as polymethine colors (cyanine colors), phthalocyanine colors, dithiol metal complex salt colors, naphthoquinone and anthraquinone colors, triphenylmethane (analogous) colors, aminium and diimmonium colors, etc., as well as azo colors, indoaniline metal complex colors, intermolecular CT colors and so forth.

In the application of the near-infrared absorbing material of the invention to optical recording materials such as optical cards, such materials can be fabricated by coating a glass, plastic resin or other substrate with a solution of the near-infrared absorbing material in an organic solvent by any of the various techniques heretofore tried in general with success, such as spin coating.

The resin which can be used as the material of said substrate is not particularly restricted but includes acrylic resin, polyethylene resin, vinyl chloride resin, vinylidene chloride resin and polycarbonate resin, among others.

The solvent to be used for spin coating is not particularly restricted but includes hydrocarbons, halogenated hydrocarbons, ethers, ketones, alcohols and Cellosolves, although alcohol solvents such as methanol, ethanol, propanol, etc. and Cellosolves such as methyl-Cellosolve, ethyl-Cellosolve, etc. are preferred.

For application of the near-infrared absorbing material of the invention in the field of near-infrared absorption filters such as plasma display filters, thermal-ray screens, or agricultural film, these can be manufactured by mixing the near-infrared absorbing material of the invention with a plastic resin and, depending on cases, an organic solvent as well and molding the mixture into a sheet or film by a conventional technique such as injection molding or casting.

The resin which can be used is not particularly restricted but includes acrylic resin, polyethylene resin, vinyl chloride resin, vinylidene chloride resin and polycarbonate resin, among others.

The solvent for use is not particularly restricted but includes hydrocarbons, halogenated hydrocarbons, ethers, ketones, alcohols and Cellosolves, although alcohol solvents such as methanol, ethanol, propanol, etc. and Cellosolve solvents such as methyl-Cellosolve and ethyl-Cellosolve are preferred.

In using the near-infrared absorbing material of the invention in a recording material such as a laser thermographic copying material or a laser thermal recording material, the near-infrared absorbing material may be used as formulated with a color-forming component or a color component or a discrete layer containing a color-forming component or a color component may be provided. As the color-forming component or color component, sublimable dyes or pigments, electron-donating dye precursor-electron-accepting compound systems, and the systems heretofore explored in which images are formed by heat-induced physicochemical changes in polymerizable polymers or the like can be employed.

For example, the color component of a laser thermographic copying material is not particularly restricted but, as pigment type components, there can be mentioned inorganic pigments such as titanium dioxide, carbon black, zinc oxide, Prussian blue, cadmium sulfide, iron oxide, chromates of lead, zinc, barium and calcium, etc. and organic pigments such as azo, thioindigo, anthraquinone, anthanthrone, triphenodioxazine, phthalocyanine, quinacridone and other pigments. The dye which can be used includes acid dyes, direct dyes, disperse dyes, oil-soluble dyes and metal-containing oil-soluble dyes, among others.

The color-forming component for a laser thermal recording material is not particularly restricted but the substances which have heretofore been utilized in thermal recording materials can be employed.

As electron-donating dye precursor, there is employed a compound having a partial skeleton in the form of a lactone, lactam, sultone, spiropyran, ester, amide, or the like, and developing color by giving off an electron or receiving a proton, for example from an acid, with said partial skeleton being opened or cleaved on contact with an electron-accepting compound. For example, there can be mentioned triphenylmethane compounds, fluoran compounds, phenothiazine compounds, indolyl-phthalide compounds, leucoauramine compounds, rhodamine-lactam compounds, triphenylmethane compounds, triazene compounds, spiropyran compounds, fluorene compounds and so forth.

As the electron-accepting compound, there can be mentioned phenolic compounds, organic acids or metal salts thereof, and hydroxybenzoic esters, among others.

EXAMPLES

The following examples are intended to describe the present invention in further detail and should by no means construed as defining the scope of the invention.

Example 1

Synthesis of 5-Anilino-2,3,3-trimethylindolenine

A dispersion composed of 92.1 g of 4-aminodiphenylamine, 500 g of dimethylformamide and 42.0 g of sodium hydrogen carbonate warmed to 50–55° C. Thereto was then added dropwise 90.8 g of 3-bromo-3-methylbutan-2-one over 1 hour. After maintaining the same temperature for 20 hours, the reaction mixture was cooled and discharged into 4000 ml of water. The crystalline precipitate was filtered off, washed with water, and dried. The thus-obtained crystalline product (95.3 g) was dispersed in 500 ml of toluene and dissolved therein by heating, and the remaining water was distilled off azeotropically with toluene. After cooling, 5.0 g of p-toluenesulfonic acid was added, the mixture was heated to the refluxing temperature, and the reaction was allowed to proceed for 15 hours while distilling off the byproduct water azeotropically with toluene. After completion of the reaction, 500 ml of a 1% aqueous solution of sodium bicarbonate was added and, after dispersion, the resulting mixture was allowed to stand. After phase separation, 85.0 g of 5-anilino-2,3,3-trimethylindolenine was recovered from the toluene layer.

The elemental analysis and melting point of this compound were as follows.

Elemental analysis ($C_{17}H_{18}N_2$): MW=250.3;

|  | C | H | N |
|---|---|---|---|
| Calcd. (%) | 81.56 | 7.25 | 11.19 |
| Found (%) | 81.39 | 7.21 | 11.03 |

Melting point (° C.): 150–152° C.

The IR spectrum of the compound obtained is shown in FIG. 1.

Example 2

Polymethine Compound (Synthesis of Specific Compound (12))

A 5.00-g portion of the 5-anilino-2,3,3-trimethylindolenine synthesized in Example 1 was reacted with 3.73 g of the alkylating agent of general formula (VI) ($R_3$=methyl, Z'=p-toluenesulfonyloxy) in 7 ml of toluene at 95–100° C. for 13 hours and, then, the toluene was distilled off.

To the residue obtained were added 2.80 g of the dianil compound of general formula (V) (L=ethylene, X=Cl), 3.50 g of potassium acetate and 70 ml of acetic anhydride, and the mixture was stirred at 45–50° C. for 60 minutes, then cooled to room temperature, and discharged into 420 ml of water. The crystalline precipitate was filtered off, washed with water, and recrystallized from methanol to give 4.47 g of specific compound (12).

The elemental analysis, melting point, maximum absorption wavelength (λmax) and gram absorption coefficient (εg) were as follows.

Elemental analysis ($C_{50}H_{51}ClN_4O_3S$): MW=823.5;

|  | C | H | N |
|---|---|---|---|
| Calcd. (%) | 72.93 | 6.24 | 6.80 |
| Found (%) | 72.66 | 6.31 | 6.69 |

Melting point (° C.): 250–255° C.; λmax: 895 nm (in diacetone alcohol); εg: $2.01 \times 10^5$ ml/g·cm.

Figure 2:
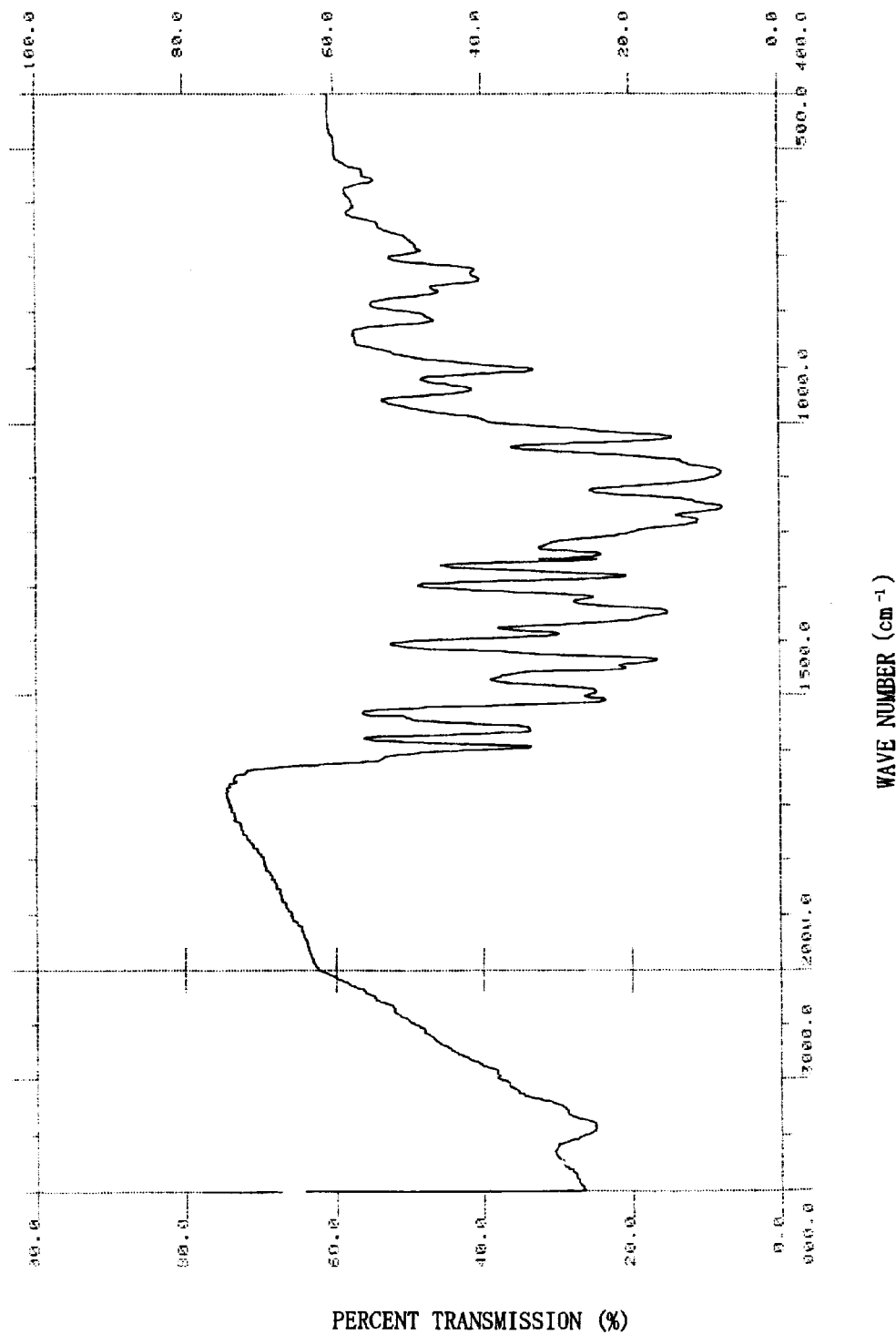
FIG. 2 is an IR absorption spectrum of the polymethine compound according to Example 2.

The IR spectrum of the compound obtained is shown in FIG. 2.

Figure 6:
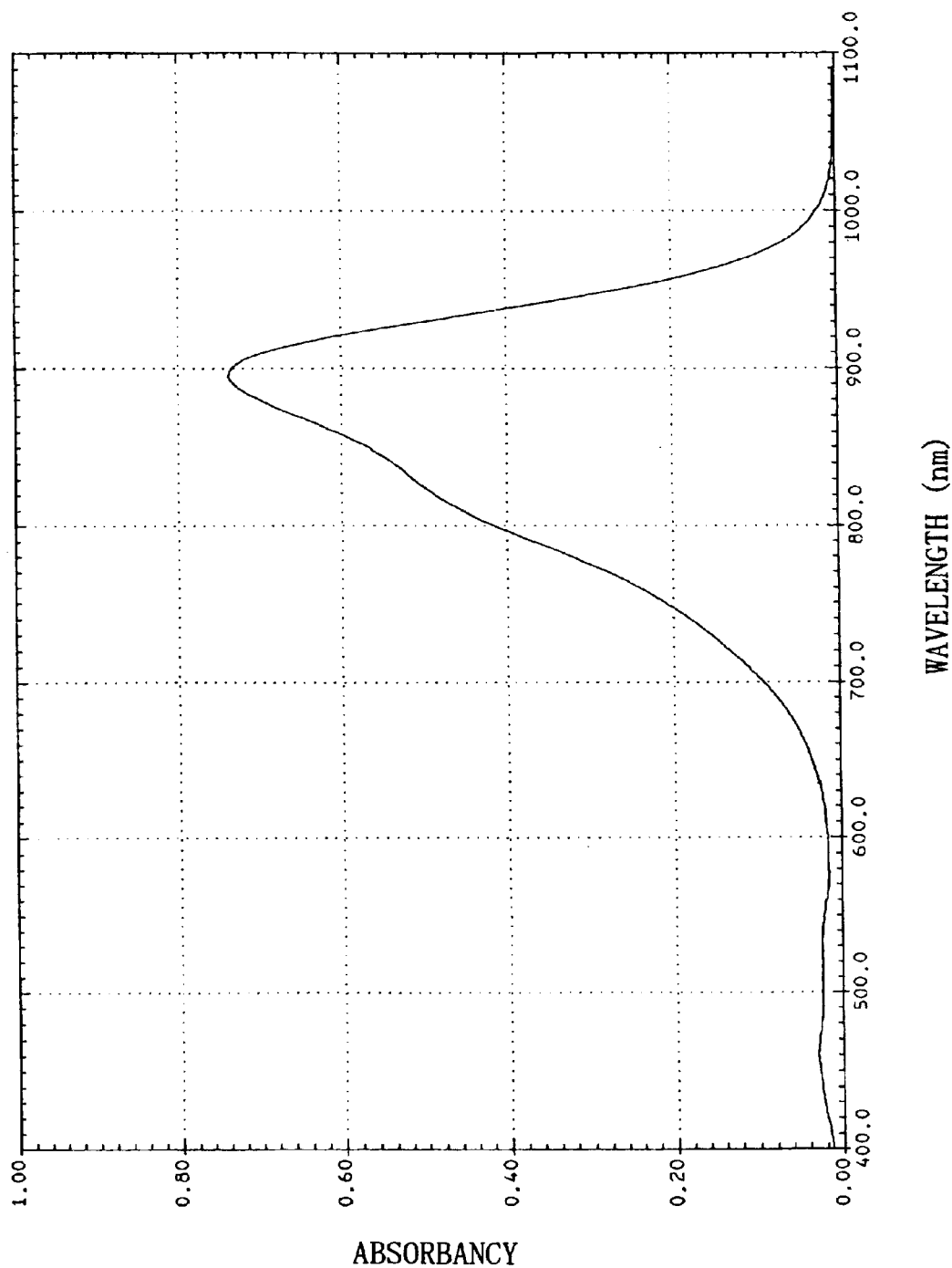
FIG. 6 is a VIS-NIR absorption spectrum of the polymethine compound according to Example 2 in diacetone alcohol.

The VIS-NIR absorption spectrum of the compound obtained is shown in FIG. 6.

Example 3

Polymethine Compound (Synthesis of Specific Compound (1))

A 10.0-g portion of the 5-anilino-2,3,3-trimethylindolenine synthesized in Example 1 was reacted with 7.46 g of the alkylating agent of general formula (VI) ($R_3$=methyl, Z'=p-toluenesulfonyloxy) in 14 ml of toluene at 95–100° C. for 13 hours, 100 ml of toluene was then added, and the mixture was cooled. Then, 20 g of a 20% aqueous solution of NaOH was added dropwise, and the reaction was allowed to proceed at 30–35° C. for 2 hours. The toluene layer was separated from the reaction mixture, and washed with 100 ml of water. The thus-obtained toluene layer was concentrated, 200 ml of IPA (isopropyl alcohol) was added, and 5.2 g of 60% perchloric acid was added dropwise at room temperature. The crystalline precipitate was filtered off, washed with 40 ml of IPA, and dried to give 10.84 g of the indolenium compound of general formula (III) ($R_3$=methyl, Z=$ClO_4^-$).

A 3.79-g portion of the compound of general formula (III) ($R_3$=methyl, Z=$ClO_4^-$), 1.96 g of the compound of general formula (V) (L=propylene, X=Cl) and 3.36 g of potassium acetate were added to 50 ml of acetic anhydride, and the mixture was stirred at 45–50° C. for 60 minutes, then cooled to room temperature, and discharged into 300 ml of water. The crystalline precipitate was filtered off, washed with water, and recrystallized from methanol to give 2.95 g of specific compound (1).

The elemental analysis, melting point, maximum absorption wavelength (λmax) and gram absorption coefficient (εg) were as follows.

Elemental analysis ($C_{44}H_{46}Cl_2N_4O_4$): MW=765.8;

|  | C | H | N |
|---|---|---|---|
| Calcd. (%) | 69.01 | 6.05 | 7.32 |
| Found (%) | 68.86 | 6.13 | 7.21 |

Melting point (° C.): 265–270° C.; λmax: 864 nm (in diacetone alcohol); εg: $2.05 \times 10^5$ ml/g·cm.

Figure 3:
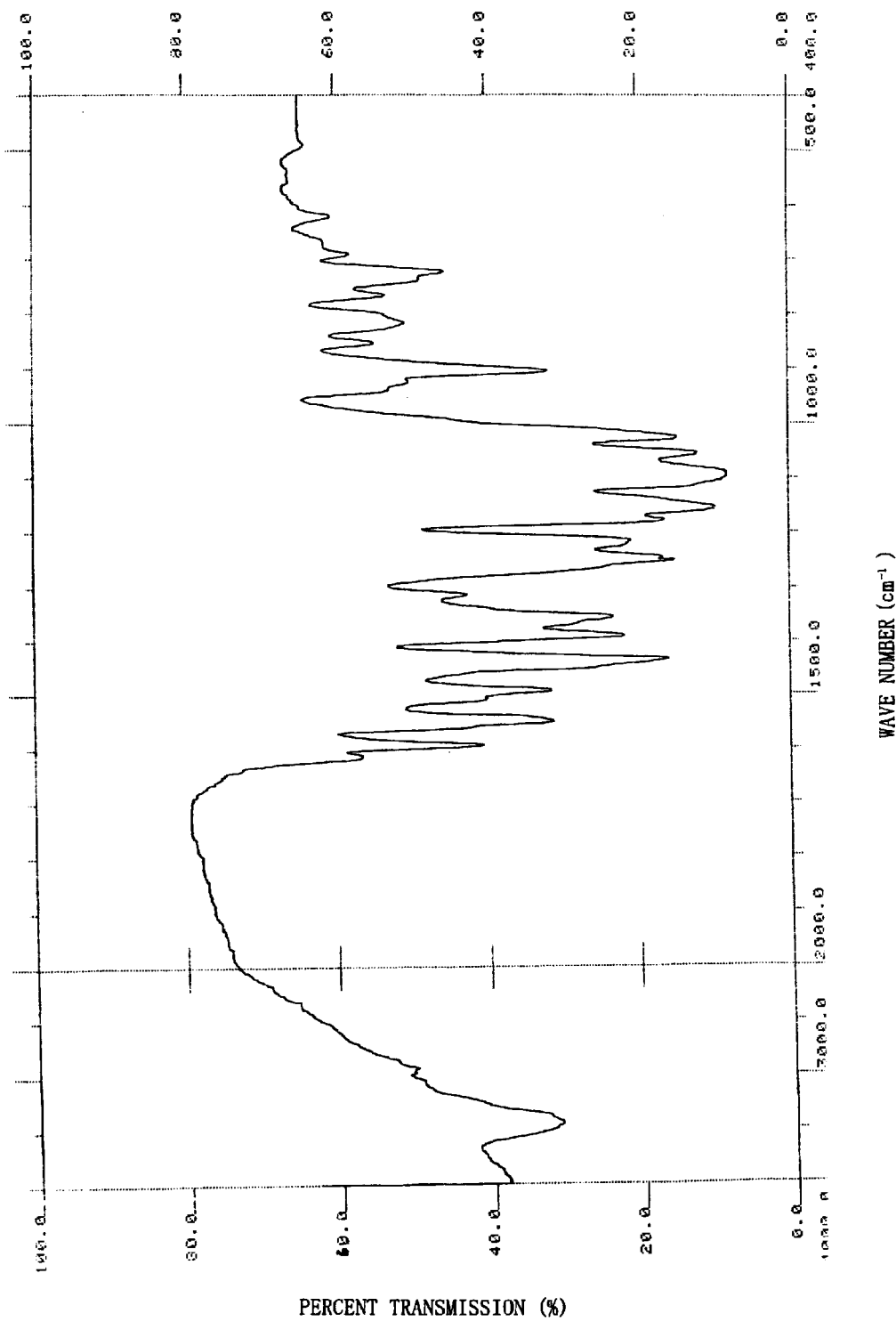
FIG. 3 is an IR absorption spectrum of the polymethine compound according to Example 3.

The IR spectrum of the compound obtained is shown in FIG. 3.

Figure 7:
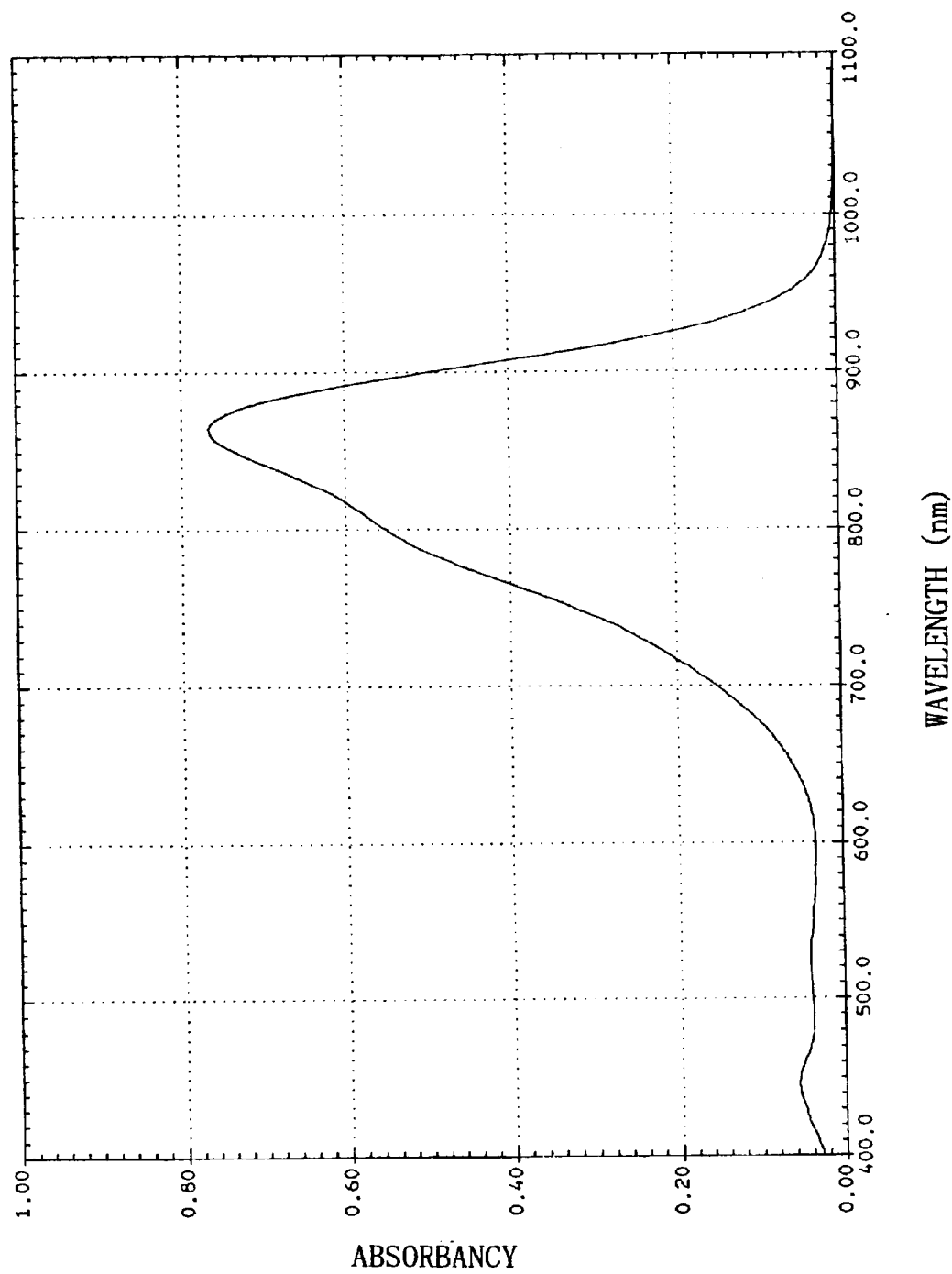
FIG. 7 is a VIS-NIR absorption spectrum of the polymethine compound according to Example 3 in diacetone alcohol.

The VIS-NIR absorption spectrum of the compound obtained is shown in FIG. 7.

Example 4

Polymethine Compound (Synthesis of Specific Compound (10))

The indolenium compound of general formula (III) ($R_3$=methoxyethyl, Z=TsO$^-$) was synthesized following the procedure of Example 3 using the alkylating agent of general formula (VI) ($R_3$=methoxyethyl, Z'=p-toluenesulfonyloxy) as the alkylating agent and using p-toluenesulfonic acid in lieu of 60% perchloric acid.

To 5.00 g of the thus-obtained compound of general formula (III) were added 1.96 g of the compound of general formula (V) (L=propylene, X=Cl), 3.36 g of potassium acetate and 50 ml of acetic anhydride, and the mixture was stirred at 45–50° C. for 60 minutes, then cooled to room temperature, and discharged into 300 ml of water. The crystalline precipitate was filtered off, washed with water, and recrystallized from methanol to give 2.92 g of specific compound (10).

The elemental analysis, melting point, maximum absorption wavelength (λmax) and gram absorption coefficient (εg) were as follows.

Elemental analysis ($C_{55}H_{61}ClN_4O_5S$): MW=925.4;

|  | C | H | N |
|---|---|---|---|
| Calcd. (%) | 71.37 | 6.64 | 6.05 |
| Found (%) | 71.16 | 6.68 | 5.92 |

Melting point (° C.): 230–235° C.; λmax: 867 nm (in diacetone alcohol); εg: $1.70 \times 10^5$ ml/g·cm.

Figure 4:
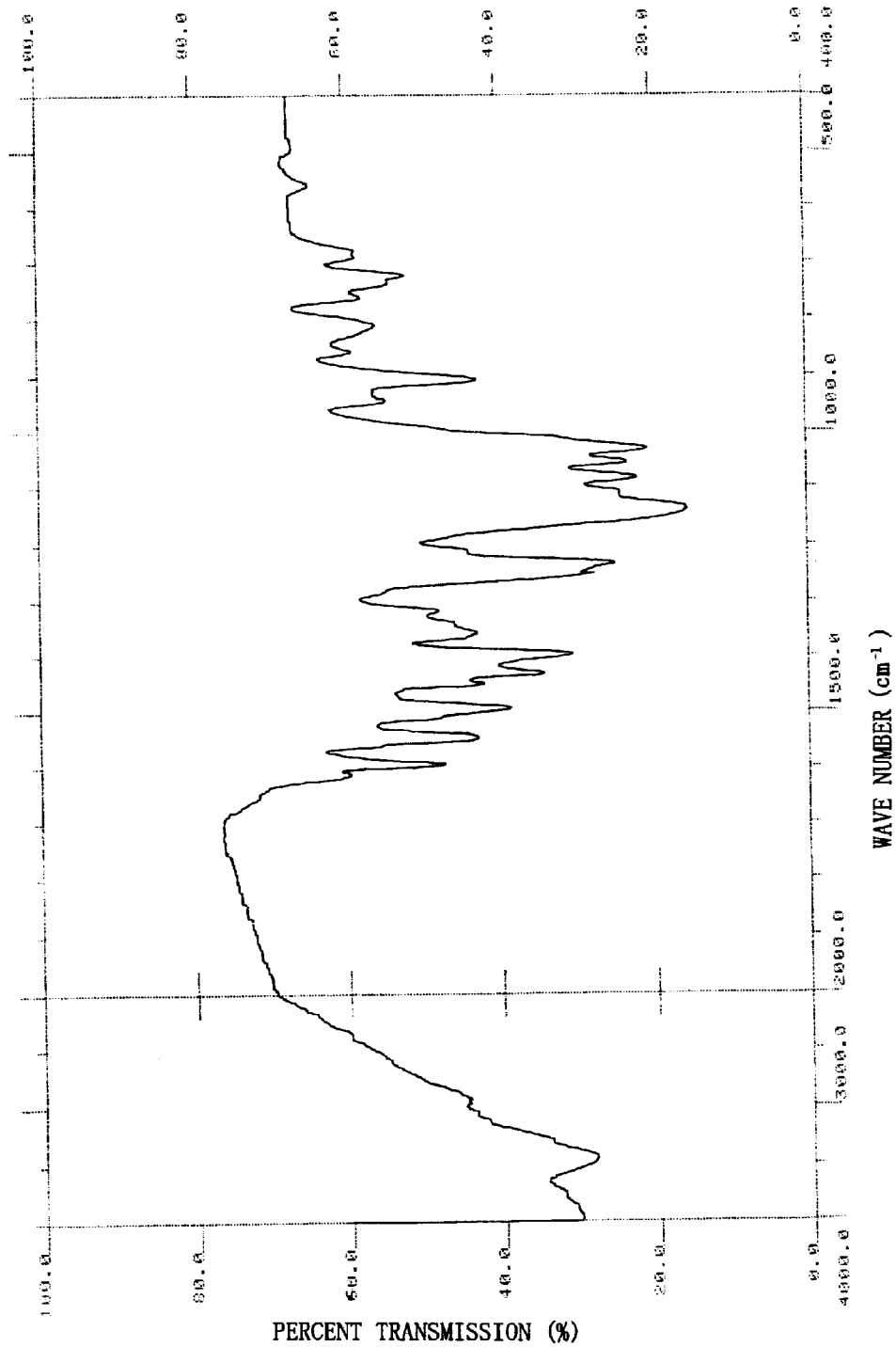
FIG. 4 is an IR absorption spectrum of the polymethine compound according to Example 4.

The IR spectrum of the compound obtained is shown in FIG. 4.

Figure 8:
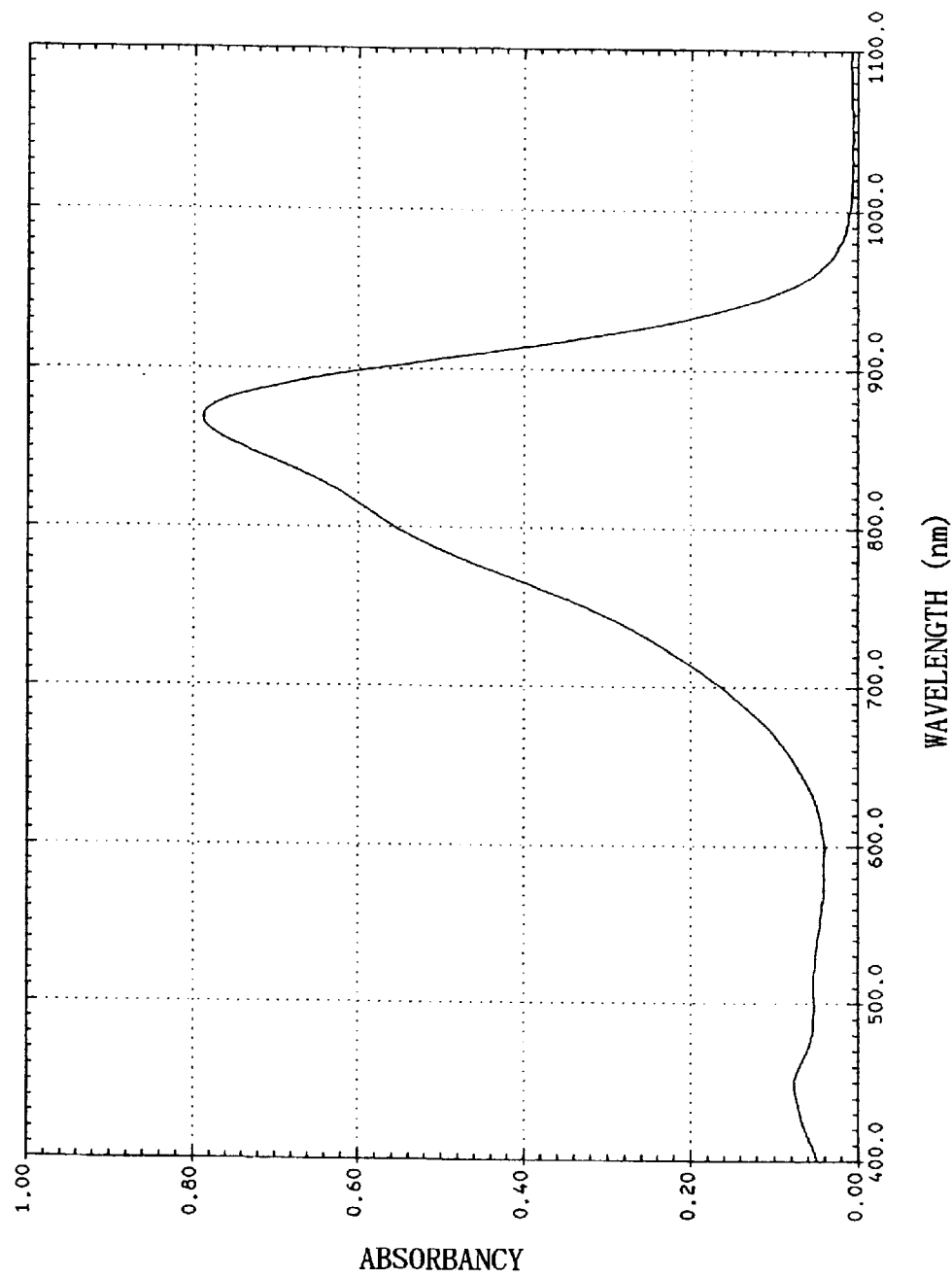
FIG. 8 is a VIS-NIR absorption spectrum of the polymethine compound according to Example 4 in diacetone alcohol.

The VIS-NIR absorption spectrum of the compound obtained is shown in FIG. 8.

Example 5

Polymethine Compound (Synthesis of Specific Compound (23))

A 3.79-g portion of the indolenium compound of general formula (III) ($R_3$=methyl, Z=$ClO_4^-$) synthesized in Example 3, 1.8 g of the compound of general formula (V) (L=ethylene, X=Cl) and 3.36 g of potassium acetate were added to 50 ml of acetic anhydride, and the mixture was stirred at 45–50° C. for 60 minutes, then cooled to room temperature, and discharged into 300 ml of water. The crystalline precipitate was filtered off, washed with water, and recrystallized from methanol to give 2.65 g of specific compound (23).

The elemental analysis, melting point, maximum absorption wavelength (λmax) and gram absorption coefficient (εg) were as follows.

Elemental analysis ($C_{43}H_{44}Cl_2N_4O_4$): MW=751.7;

|  | C | H | N |
|---|---|---|---|
| Calcd. (%) | 68.70 | 5.90 | 7.45 |
| Found (%) | 68.51 | 5.98 | 7.32 |

Melting point (° C.): 238–243° C.; λmax: 896 nm (in diacetone alcohol); εg: $2.07 \times 10^5$ ml/g·cm.

Figure 5:
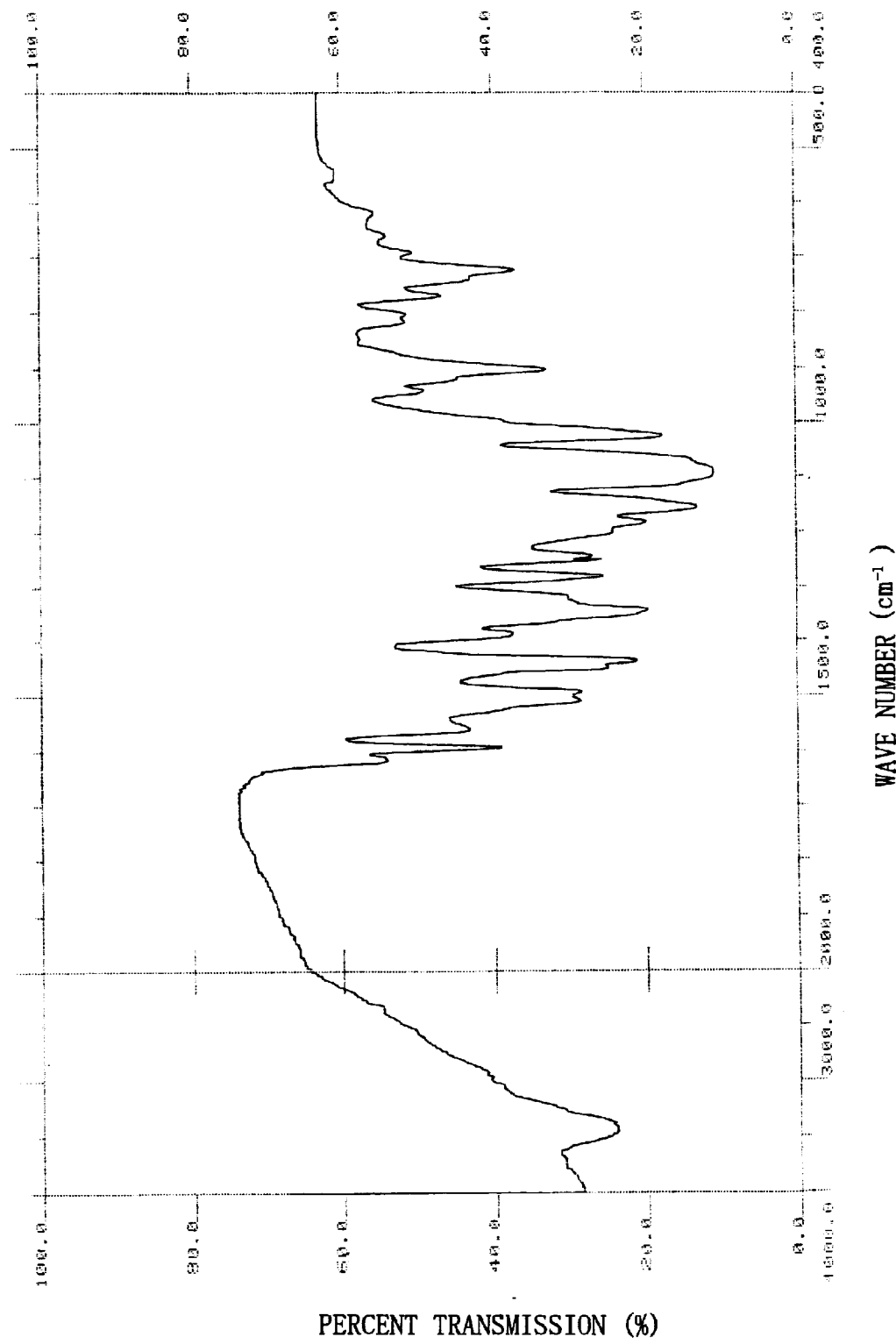
FIG. 5 is an IR absorption spectrum of the polymethine compound according to Example 5.

The IR spectrum of the compound obtained is shown in FIG. 5.

Figure 9:
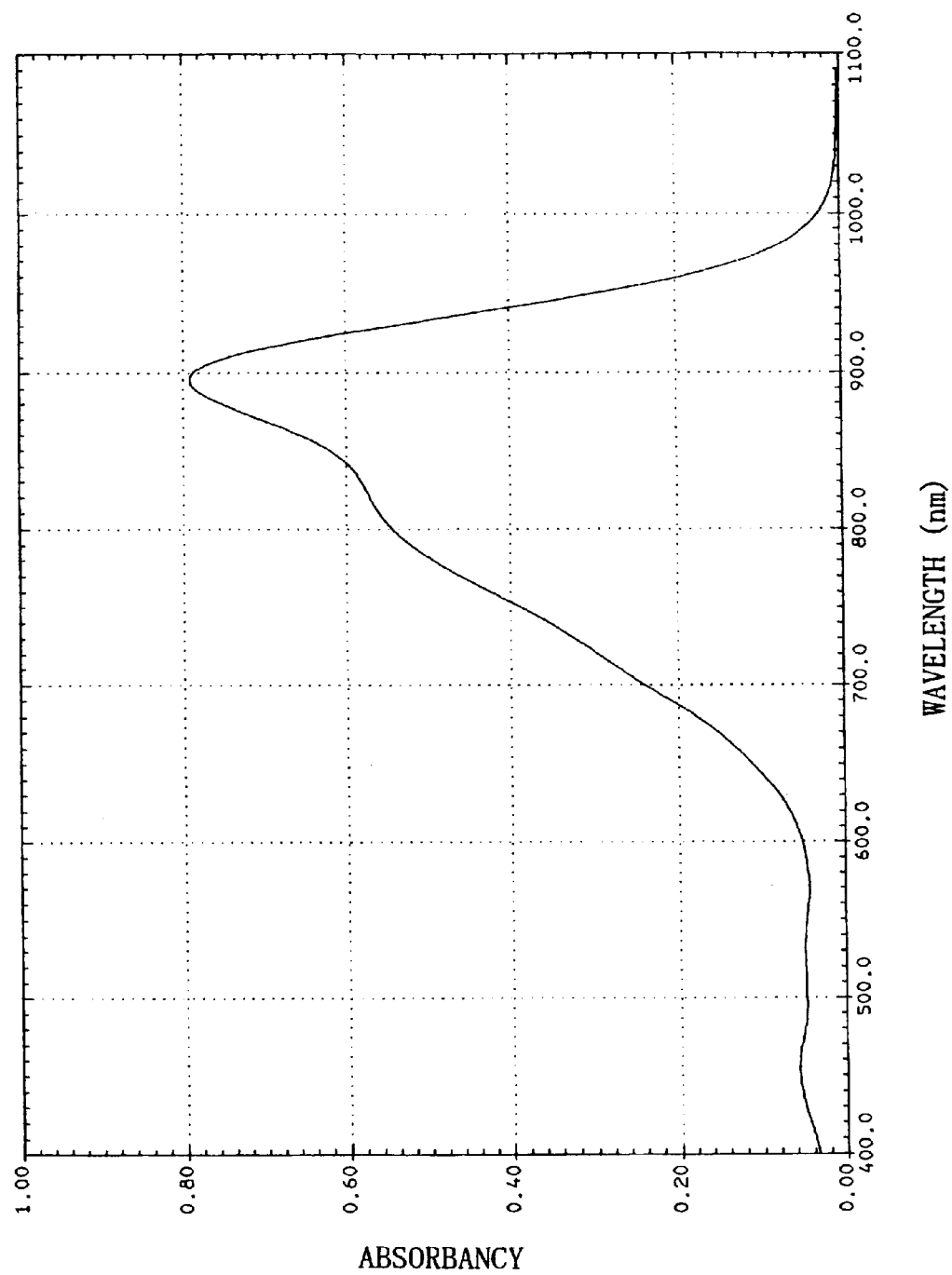
FIG. 9 is a VIS-NIR absorption spectrum of the polymethine compound according to Example 5 in diacetone alcohol.
Figure 10:
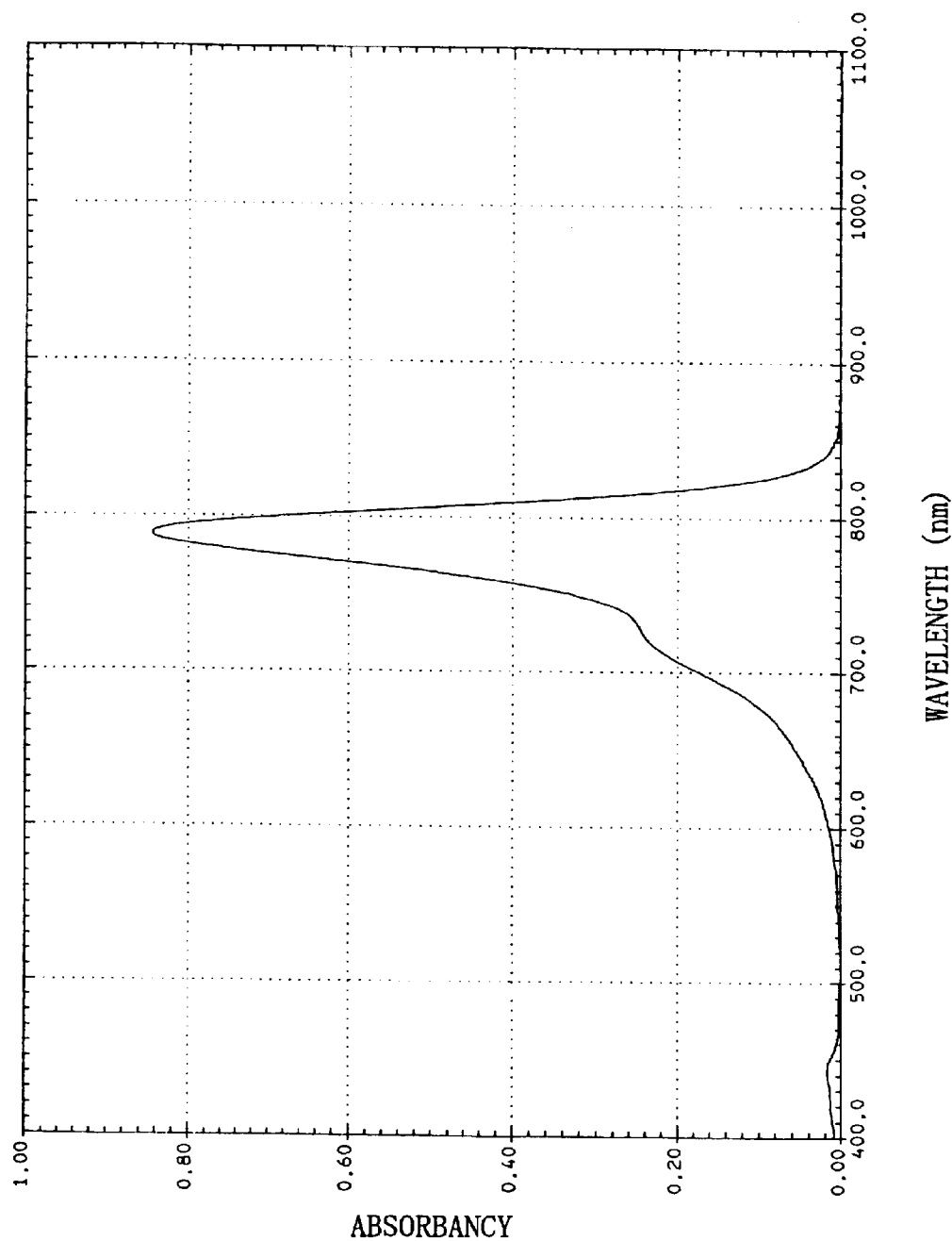
FIG. 10 is a VIS-NIR absorption spectrum of the A compound according to Comparative Example 1 in diacetone alcohol.

The VIS-NIR absorption spectrum of the compound obtained is shown in FIG. 9.

Example 6

Production of Near-infrared Absorbing Material

A sample was produced by coating a polyethylene terephthalate (PET) film having an average thickness of 5 μm with a solution prepared by dissolving 0.2 g of specific compound (1) and 10 g of Delpet 80N (product of Asahi Chemical Industry; acrylic resin) in 90 g of a toluene/methyl ethyl ketone (1/1) solvent in a dry film thickness of about 5 μm using a wire bar.

A single-mode semiconductor laser (wavelength: 840 nm) was disposed so that the laser beams passing through a condenser lens would produce a beam diameter of 10 μm on the surface of the above sample. The semiconductor laser was adjusted so that the laser power reaching the surface might be varied in the range of 50–200 mW, and the sample was irradiated with single pulses at a pulse width of 20 μs. Observation of the irradiated sample under an optical microscope revealed the formation of through-holes with a diameter of about 10 μm when the laser powder reaching the surface was 50 mW.

Example 7

Production of Near-infrared Absorbing Material

The procedure of Example 6 was followed in the same manner except that 0.2 of specific compound (12) was used in lieu of 0.2 g of specific compound (1). Observation of the sample after completion of irradiation under an optical microscope revealed the formation of through-holes with a diameter of about 10 μm when the laser power reaching the surface was 50 mW.

Comparative Example 1

The procedure of Example 6 was followed in the same manner except that 0.2 of the polymethine compound (compound A) described in JP Kokai S63-319191 and having the structural formula shown below was used in lieu of 0.2 g of specific compound (1). Observation of the sample after completion of irradiation under an optical microscope failed to reveal the formation of through-holes even when the laser power reaching the surface was 100 mW.

Compound A

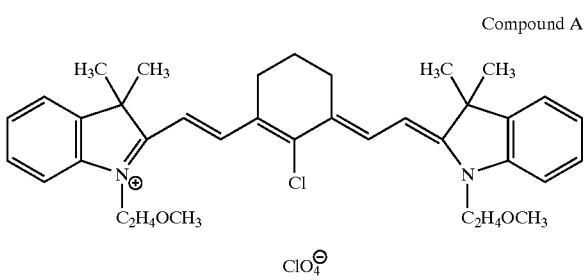

Comparative Example 2

The procedure of Example 6 was followed in the same manner except that 0.2 of the polymethine compound (compound B) described in Journal of Organic Chemistry, 60, 2392, Table 1 and having the structural formula shown below was used in lieu of 0.2 g of specific compound (1). Observation of the sample after completion of irradiation under an optical microscope failed to reveal the formation of through-holes even when the laser power reaching the surface was 100 mW.

Compound B

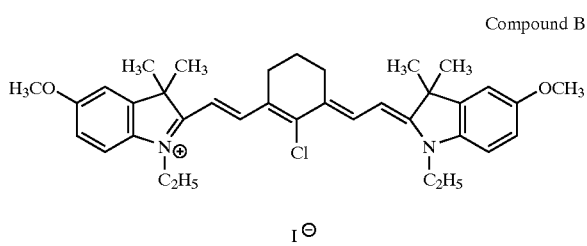

INDUSTRIAL APPLICABILITY

The polymethine compound of general formula (I) shows high absorptivity in the near-infrared region of 750–950 nm, in particular in the near-infrared region of 850–950 nm, but absorbs little in the visible region. It is highly soluble in solvents and highly compatible with resins. Therefore, a near-infrared absorbing material comprising this compound shows good sensitivity to laser beams and high photothermal conversion efficiency and, when processed to give films and the like, is discolored only slightly, retaining high transparency, hence it is judiciously used as a near-infrared absorbing material in various fields of application.

What is claimed is:

1. A polymethine compound of the general formula (I):

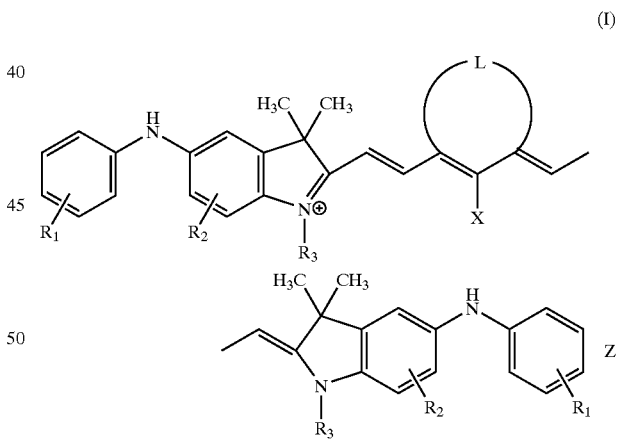

(I)

wherein $R_1$ and $R_2$ each independently represents a hydrogen atom, an alkyl group or an alkoxy group, $R_3$ represents an alkyl group, which may optionally be substituted, L represents an alkylene group necessary for the formation of a cyclic structure, X represents a hydrogen atom, a halogen atom or a substituted amino group, and Z represents an acidic residue.

2. The polymethine compound according to claim 1, wherein $R_1$ and $R_2$ each independently is a hydrogen atom, an alkyl group containing 1 to 4 carbon atoms or an alkoxy group containing 1 to 4 carbon atoms.

3. The polymethine compound according to claim 1, wherein $R_3$ is an alkyl group containing 1 to 8 carbon atoms or an alkoxyalkyl group containing 2 to 8 carbon atoms in total.

4. The polymethine compound according to claim 1, wherein L is an alkylene group containing 2 to 4 carbon atoms.

5. The polymethine compound according to claim 1, wherein X is F, Cl, Br, I, ethylamino, phenylamino or diphenylamino.

6. The polymethine compound according to claim 1, wherein Z is $Cl^-$, $Br^-$, $I^-$, $ClO_4^-$, $BF_4^-$, $PF_6^-$, $SbF_6^-$, $CF_3CO_2^-$, $CF_3SO_3^-$, $CH_3SO_3^-$, or p-toluenesulfonato.

7. The polymethine compound according to claim 1, wherein $R_1$ and $R_2$ each is a hydrogen atom.

8. The polymethine compound according to claim 1, wherein $R_3$ is an alkyl group containing 1 to 4 carbon atoms or an alkoxyalkyl group containing 2 to 6 carbon atoms in total.

9. The polymethine compound according to claim 1, wherein L is an alkylene group containing 2 or 3 carbon atoms.

10. The polymethine compound according to claim 1, wherein X is Cl.

11. 5-Anilino-2,3,3-trimethylindolenine of the formula:

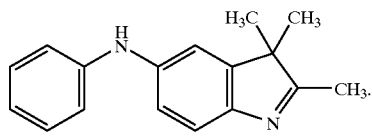

12. A near-infrared absorbing material which comprises the polymethine compound according to any of claims 1 to 10.

13. The polymethine compound according to claim 1, wherein $R_1$ and $R_2$ each independently is a hydrogen atom, an alkyl group containing 1 to 4 carbon atoms, or an alkoxy group containing 1 to 4 carbon atoms; $R_3$ is an unsubstituted alkyl group containing 1 to 8 carbon atoms or an alkoxyalkyl group containing 2 to 8 carbon atoms in total; L is an alkylene group containing 2 to 4 carbon atoms; X is F, Cl, Br, I, ethylamino, phenylamino or diphenylamino; and Z is $Cl^-$, $Br^-$, $ClO_4^-$, $BF_4^-$, $PF_6^-$, $SbF_6^-$, $CF_3CO_2^-$, $CF_3SO_3^-$, $CH_3SO_3^-$, or $TSO^-$.

* * * * *